United States Patent [19]

Takei et al.

[11] Patent Number: 5,391,664
[45] Date of Patent: Feb. 21, 1995

[54] PROCESS FOR PRODUCING POLYMER

[75] Inventors: Kazuo Takei; Toshiaki Matsunaga, both of Osaka; Taketo Toba, Hyogo; Hiroyuki Ikeuchi, Osaka; Fumihide Tamura, Shiga, all of Japan

[73] Assignee: Nippon Shokubai Co., Ltd., Osaka, Japan

[21] Appl. No.: 115,009

[22] Filed: Sep. 1, 1993

[30] Foreign Application Priority Data

Sep. 3, 1992 [JP] Japan ................. 4-236205
Feb. 10, 1993 [JP] Japan ................. 5-022965

[51] Int. Cl.$^6$ .............................. C08F 2/06
[52] U.S. Cl. .................. 526/210; 526/225; 526/234
[58] Field of Search ............ 526/210, 225, 234

[56] References Cited

U.S. PATENT DOCUMENTS

| | | | |
|---|---|---|---|
| 3,516,974 | 6/1970 | Rinkler et al. | 526/234 |
| 3,673,168 | 6/1972 | Burke, Jr. et al. | 526/229.5 |
| 3,842,019 | 10/1974 | Kropp | 526/225 |
| 4,207,238 | 6/1980 | Gilles . | |
| 4,238,397 | 12/1980 | Gilles . | |
| 4,929,655 | 5/1990 | Takeda et al. . | |
| 4,972,036 | 11/1990 | Elmore et al. | 526/212 |
| 5,130,369 | 7/1992 | Hughes et al. | 526/210 |
| 5,145,924 | 9/1992 | Shere et al. | 526/225 |
| 5,171,771 | 12/1992 | Price et al. | 526/210 |
| 5,171,802 | 12/1992 | Salazar | 526/225 |

FOREIGN PATENT DOCUMENTS

| | | | |
|---|---|---|---|
| 183466 | 6/1986 | European Pat. Off. . | |
| 1050063 | 2/1959 | Germany | 526/234 |
| 1110868 | 7/1961 | Germany | 526/225 |
| 1174989 | 7/1964 | Germany | 526/225 |
| 1201555 | 9/1965 | Germany | 526/210 |
| 398386 | 5/1964 | Japan | 526/234 |
| 42-15616 | 8/1967 | Japan | 526/225 |
| 46-7261 | 2/1971 | Japan | 526/210 |
| 48-25745 | 7/1973 | Japan | 526/234 |
| 54-47782 | 4/1979 | Japan . | |
| 58-71901 | 4/1983 | Japan | 526/225 |
| 59-78203 | 5/1984 | Japan | 526/225 |
| 60-110708 | 6/1985 | Japan . | |
| 60-240716 | 11/1985 | Japan | 526/210 |
| 60-258212 | 12/1985 | Japan . | |
| 61-72008 | 4/1986 | Japan | 526/225 |
| 61-276809 | 12/1986 | Japan | 526/210 |
| 62-20502 | 1/1987 | Japan . | |
| 4-202504 | 7/1992 | Japan . | |
| 4-202508 | 7/1992 | Japan . | |
| 791308 | 2/1958 | United Kingdom | 526/234 |
| 919926 | 2/1963 | United Kingdom | 526/225 |
| 980743 | 1/1965 | United Kingdom | 526/210 |
| 93/03066 | 2/1993 | WIPO . | |

OTHER PUBLICATIONS

Reed, Jr., 9 *J. Polymer Sci.* 2029 (1971).

*Primary Examiner*—Joseph L. Schofer
*Assistant Examiner*—N. Sarofim
*Attorney, Agent, or Firm*—Armstrong, Westerman, Hattori, McLeland & Naughton

[57] ABSTRACT

This invention provides a process by which a polymer having a hydroxyl group at both terminals can be easily obtained with a cheap price and good efficiency from a wide field of vinyl-based monomers including polar ones. The process is arranged in such a manner that the polymerization of a vinyl-based monomer (a) is performed in the presence of an alcohol (b) having no addition-polymerization reactivity by using an initiator (c) consisting essentially of a peroxide and, on this occasion, at least one of catalysts (d) selected from a group consisting of an organic sulfonic acid compound having no addition-polymerization reactivity and an inorganic acid is further used and a reactor does not substantially contain any component other than the (a), (b), (c) and (d).

20 Claims, No Drawings

PROCESS FOR PRODUCING POLYMER

TECHNICAL FIELD

The present invention relates to a process for producing a polymer having a hydroxyl group at both terminals.

BACKGROUND ART

A polymer having a hydroxyl group at both terminals is able to convert easily the hydroxyl group into other functional groups by carrying out a suitable reaction on the terminal hydroxyl group, and also, the polymer itself converts into a linear molecule and/or a network molecule by using reactivity of the terminal hydroxyl group and carrying out a suitable reaction on this hydroxyl group and, as a result, the polymer becomes a high-molecular weight compound having excellence in various properties such as strength, heat resistance, weather resistance, durability and so forth.

This polymer having a hydroxyl group at both terminals has, for example, the following great advantages ① to ⑥ by displaying a feature such as having a hydroxyl group at both terminals.

① In a case where the polymer is used as a raw material (a crosslinking agent and the like) for various kinds of resins such as a polyester resin, a polyurethane resin, a polycarbonate resin and the like, since there is not any unreacted material, all polymers are surely assembled in a resin-crosslinked structure. Therefore, various kinds of resins using the polymer does not show physical property-lowering derived from the unreacted material.

② A polymer in which a functional group has been introduced into a side chain by copolymerizing a vinyl-based monomer having a functional group such as a hydroxyl group, a carboxyl group, an amino group and the like (hereinafter, abbreviated as "a copolymer of a functional group-containing vinyl-based monomer"); when said polymer is used for a reaction, its terminal becomes a play part (a free terminal) which is not assembled in the resin crosslinked) structure, but such a thing does not occur in a polymer having a hydroxyl group at both terminals.

③ Compared with the copolymer of a functional group-containing vinyl-based monomer, because scattering in the distance between the functional groups is very small, the distance between reacting sites (crosslinking sites) is nearly constant, so that a homogeneous resin (-crosslinked) structure is made.

④ In a case of a copolymer of a functional group-containing vinyl-based monomer, even if the synthesis of a thermoplastic polymer is attempted by making a material of 2.0 in the average number of functional groups and by allowing this to react with a chain-elongating agent having two functionalities, since a polymer having three or more functionalities is statistically included because of a reason originated from the synthetic process, a thermosetting polymer is obtained as the major part, and a thermoplastic polymer cannot be synthesized. However, in a case of a polymer having one hydroxyl group at each of both terminals and not containing a polymer having three or more functionalities, a thermoplastic polymer of which chain has been elongated can be easily synthesized.

⑤ In a case of a polymer having a hydroxyl group at both terminals and having at least two hydroxyl groups at one or more terminals, compared with a polymer having a hydroxyl group at both terminals, but only one hydroxyl group at the terminals, there is recognized an advantage that, because of increased crosslinking density, physical strength of a crosslinked matter can be elevated, and furthermore, reactivity of the terminal hydroxyl group can be elevated due to a synergistic effect of the terminal hydroxyl group.

⑥ In a case of using a polymer having a hydroxyl group at both terminals and having at least two hydroxyl groups at one or more terminals, in the use of a thermosetting-resin it is unnecessary to add either an expensive trifunctional isocyanate (NCO) compound or a polyol having three or more functionalities and displaying inferior handling performance, both of which are required in a case of curing a polymer having only one hydroxyl group at a terminal.

The polymer having a hydroxyl group at both terminals, by taking the above-described advantages, is very useful as a raw material or an additive for various resins such as a polyester resin, a polyurethane resin, a polycarbonate resin and the like and for various block polymers, and further, the polymer itself is very useful for uses such as a coating (a high solid coating, a low temperature curing coating, a water borne two-liquid type urethane coating, a water borne urethane coating, a powder coating and the like), an elastic wall material, waterproof for paint film, a pressure-sensitive adhesive, a floor material, a tackifier, an adhesive, binders (a magnetic recording medium, an ink binder, a casting binder, a burned brick binder, a graft material, a microcapsule, glass fiber sizing and the like), a sealant, urethane foam (hard, semihard, and soft type), urethane RIM, an UV-EB-curing resin, thermosetting type elastomer, microcellular, a fiber-processing agent, a plasticizer, a sound absorption material, a vibration-controlling material, a surfactant, a gel coat agent, a resin for artificial marble, an impact resistance-affording agent for artificial marble, a flexibility-affording agent for an epoxy resin and the like, a resin for ink, a film (a laminate adhesive, a protective film and the like), a resin, for laminated glass, a reactive diluent, various molding materials, elastic fiber, artificial leather, synthetic leather, a dispersing agent, an aqueous urethane emulsion and the like.

As the polymer having a hydroxyl group used hitherto for the above-mentioned uses are cited a copolymer of a vinyl-based monomer having a hydroxyl group on a side chain as well as a polyether, polyester, polybutadiene and polycarbonate having a hydroxyl group at a terminal and the like. However, first, since the copolymer of a vinyl-based monomer having a hydroxyl group on a side chain is prepared by a random type radical polymerization reaction between a monomer having a hydroxyl group and a monomer having no hydroxyl group, by-product formation of a copolymer having no hydroxyl group is difficult to suppress and, in order to avoid this formation, it is necessary to increase the hydroxyl group content in the copolymer and also, there is found scattering in the number of hydroxyl groups contained in one molecule. Because of this, in a case where a reaction is carried out between the copolymer of a vinyl-based monomer having a hydroxyl groups on a side chain and a polyfunctional compound capable of reacting with a hydroxyl group, a polymer showing sufficient stretching (processing performance for bending is excellent) and toughness is not obtained by reasons of remaining unreacted copolymer and large scattering in a distance between reaction sites, and by that a play chain part which does not directly participate in the structure of a crosslinked matter obtained after reaction is formed and a hydroxyl group not participating in the reaction remains. On the other hand, polyether, polyester, polybutadiene and the like having a hydroxyl group at a terminal, because they have a hydroxyl group at a polymer terminal, have a little defect which a copolymer of a vinyl-based monomer having a hydroxyl group on a side chain has. However, in a case of the polyether because of an ether bond on a main chain, in a case of the polyester because of an ester bond on a main chain, and in a case of the polybutadiene because of an unsaturated double bond on a main chain, these polymers have defects such as poor weather resistance, water resistance, heat resistance and the like.

As described above, at present, among polymers having a hydroxyl group, which are used as raw materials for the aforementioned uses, as additives for various resins and as raw materials for the resins there is not found any member satisfactory for all demands and capabilities such as toughness, stretching (processing performance for bending), weather resistance, water resistance, heat resistance and the like.

Although it is considered that a problem of this sort may be solved by a vinyl-based polymer having a hydroxyl group at both terminals, as mentioned below, the real situation is that any process for producing industrially a polymer having a hydroxyl group at both terminals from a wide range of vinyl-based monomers including polar vinyl-based monomers such as acrylic acid, an acrylic acid ester, methacrylic acid, a methacrylic acid ester and the like has not yet been established.

An example of a process for producing a vinyl-based polymer having a hydroxyl group at a terminal is a process such as introducing one hydroxyl group into one terminal of the polymer by using 2-mercaptoethanol and the like as chain-transfer agent and introducing another one (as an average) hydroxyl group into a polymer molecule by copolymerizing with 2-hydroxyethyl methacrylate and the like.

However, in this process, although two hydroxyl groups per one molecule of a polymer are introduced as average, only one of the two hydroxyl groups is introduced into one terminal of the polymer and another hydroxyl group is introduced not into the terminal, but into the middle of a main chain. Furthermore, since another one hydroxyl group is introduced by a copolymerization reaction, the total number of hydroxyl groups per one molecule of the polymer is in a scatter distribution such as being from one to three or more, and a wide distribution is seen in a distance between hydroxyl groups. Accordingly, an obtained polymer cannot almost display the aforementioned merit which the polymer having a hydroxyl group at both terminals has. Furthermore, because of adding a mercaptan compound, there are problems that the polymerization reaction becomes extremely slow, the polymerization conversion does not rise, and the smell of residual mercaptan remains.

Examples of a process for producing a vinyl-based polymer having a hydroxyl group at both terminals are, as shown in the undermentioned (i) to (iii), processes comprising carrying out a radical polymerization reaction of a vinyl-based monomer in the presence of various kinds of initiators and chain-transfer agents and the like.

(i) A process for producing a polymer having a hydroxyl group at both terminals by polymerizing styrene or butadiene by using an initiator having a hydroxyl group (refer to "*Journal of Polymer Science*", Part A1, Volume 9, p. 2029, published in 1971).

(ii) A process for producing a polymer having a hydroxyl group at both terminals, comprising a thermal polymerization reaction or a photopolymerization reaction carried out by using a dithiocarbamate or thiuram disulfide, both of which have a hydroxyl group, as an initiator, or comprising a polymerization reaction carried out by using the dithiocarbamate or thiuram disulfide as a chain transfer agent and using hydrogen peroxide and the like as an initiator (refer to Japanese Official Patent Provisional Publication No. showa 61-271306).

(iii) A process for producing a polymer having a hydroxyl group at both terminals, comprising a polymerization reaction carried out by using a disulfide, a trisulfide or the like having a hydroxyl group at both terminals as a chain transfer agent (refer to Japanese Official Patent Provisional Publication No. showa 54-47782.

However, the aforementioned conventional processes (i) to (iii) for producing a polymer having a hydroxyl group at both terminals have respective defects, as mentioned below, and it is not easy to synthesize a polymer having a hydroxyl group at both terminals surely, with a cheap price, simply and industrially from many kinds of vinyl-based monomers.

First, in the process (i), there is a problem that a usable vinyl-based monomer is limited to butadiene and styrene, and a polar vinyl-based monomer such as an acrylic acid ester, a methacrylic acid ester and the like cannot be used.

Next, in the process (ii), there is a problem that the thiuram disulfide having a functional group such as a hydroxyl group and the like is unstable and, thereby, its treating is difficult and also, a produced polymer is colored into yellow.

Finally, in the process (iii), there are the same problem as the aforementioned process (ii) and a problem that a flake of the initiator is introduced into a polymer terminal and a polymer having a hydroxyl group at only one terminal is formed as a by-product and, therefore, a polymer having terminal hydroxyl groups in a low number is formed.

As described above, at the present time there has not been established any process for producing industrially a polymer having a hydroxyl group at both terminals from a wide field of vinyl-based monomers including polar vinyl-based monomers such as acrylic acid, an acrylic acid ester, methacrylic acid, a methacrylic acid ester and the like.

Under these circumstances, it is an object of the present invention to provide a process by which a polymer having a hydroxyl group at both terminals can be easily obtained with a cheap price and good efficiency from a wide field of vinyl-based monomers including polar vinyl-based monomers such as acrylic acid, an acrylic acid ester, methacrylic acid, a methacrylic acid ester and the like.

DISCLOSURE OF INVENTION

To solve the above object, a process relating to the present invention for producing a polymer is a process comprising carrying out a polymerization reaction of a vinyl-based monomer (a) in the presence of an alcohol (b) having no addition-polymerization reactivity by using an initiator (c) consisting essentially of a peroxide, and furthermore, the process is characterized in that at least one of catalysts (d) selected from a group consisting of an organic sulfonic acid compound having no addition-polymerization reactivity and an inorganic acid is further used, and that a reactor does not substantially contain any component other than the (a), (b), (c) and (d).

Here, a polymer obtained by the production process of present invention is a polymer having a hydroxyl group at both terminals (Hereinafter, this polymer may be referred to as "polymer (h)". Furthermore, among constituents of the present invention, the alcohol (b) having no addition-polymerization reactivity may be referred to as "alcohol (s) (b)", the initiator (c) consisting essentially of a peroxide may be referred to as "initiator(s) (c)", and at least one of catalysts (d) selected from a group consisting of an organic sulfonic acid compound having no addition-polymerization reactivity and an inorganic acid may be referred to as "catalyst(s) (d)" .).

Hereinafter, first, a process relating to the present invention for producing a polymer is explained.

A vinyl-based monomer (a) used in this invention is not especially limited as far as it is a vinyl-based monomer hitherto known in public, however, there are cited, for example, (meth)acrylic acid; alkyl (meth)acrylates such as methyl (meth) acrylate, ethyl (meth)acrylate, butyl (meth) acrylate, cyclohexyl (meth)acrylate, 2-ethylhexyl (meth) acrylate, n-octyl (meth)acrylate, dodecyl (meth)acrylate, stearyl (meth) acrylate and the like; aryl (meth)acrylates such as benzyl (meth)acrylate and the like; substituted alkyl (meth) acrylates such as 2-hydroxyethyl (meth) acrylate, hydroxypropyl (meth)acrylate, glycidyl (meth) acrylate, 2-aminoethyl (meth)acrylate, $\tau$-(methacryloyloxypropyl)trimethoxysilane and the like; (meth) acrylic acid derivatives such as methoxyethyl (meth) acrylate, a (meth)acrylic acid-ethylene oxide adduct and the like; maleic anhydride, maleic acid, and monoalkyl and dialkyl esters of maleic acid; fumaric acid, and monoalkyl and dialkyl esters of fumaric acid; aromatic vinyl-based monomers such as styrene, $\alpha$-methylstyrene, methylstyrene, chlorostyrene, styrenesulfonic acid, a sodium salt of styrenesulfonic acid, and the like; fluorine-containing vinyl-based monomers such as perfluoromethyl (meth) acrylate, perfluoroethyl (meth)acrylate, perfluoropropyl (meth)acrylate, perfluorobutyl (meth)acrylate, perfluorooctyl (meth)acrylate, trifluoromethylmethyl (meth) acrylate, 2-trifluoromethylethyl (meth)acrylate, diperfluoromethylmethyl (meth)acrylate, 2-perfluoroethylethyl (meth)acrylate, 2-perfluoromethyl-2perfluoroethylethyl (meth)acrylate, triperfluoromethylmethyl (meth)acrylate, 2-perfluoroethyl-2-perfluorobutylethyl (meth)acrylate, 2-perfluorohexylethyl (meth)acrylate, 2-perfluorodecylethyl (meth)acrylate, 2-perfluorohexadecylethyl (meth)acrylate, perfluroethylene, perfluropropylene, vinylidene fluoride and the like; trialkoxysilyl group-containing vinyl-based monomers such as vinyltrimethoxysilane, vinyltriethoxysilane and the like; silicon-containing vinyl-based monomers such as $\tau$-methacryloyloxypropyl) trimethoxysilane and the like; maleimide derivatives such as maleimide, methylmaleimide, ethylmaleimide, propylmaleimide, butylmaleimide, octylmaleimide, dodecylmaleimide, stearylmaleimide, phenylmaleimide, cyclohexylmaleimide and the like; nitrile group-containing vinyl-based monomers such as acrylonitrile, methacrylonitrile and the like; amide group-containing vinyl-based monomers such as acrylamide, methacrylamide and the like; vinyl esters such as vinyl acetate, vinyl propionate, vinyl pivalate, vinyl benzoate, vinyl cinnamate and the like; alkenes such as ethylene, propylene and the like; dienes such as butadiene, isoprene and the like; vinyl chloride, vinylidene chloride, allyl chloride, allyl alcohol and the like. Among these, methacrylic acid, methacrylic acid esters, acrylic acid, acrylic acid esters and styrene are preferably used. These may be used either as one kind alone or in combination of plural kinds.

As seen above, the vinyl-based monomer (a) used in this invention may include a case having a functional group such as a hydroxyl group, a carboxyl group, an amino group and the like in the molecule.

Especially, in a case where a relatively high cross-linking density is required, for example, in the coating use and the like, it is that preferable some amounts of a vinyl-based monomer having a functional group is jointly used. An amount for use of the vinyl-based monomer having a functional group is not especially limited, but, for example, in a case of a vinyl-based monomer having a hydroxyl group, it is preferable that the vinyl-based monomer having a hydroxyl group is in an amount of 1 to 50% by weight based on the whole used vinyl-based monomers (a), and more preferable that it is in an amount of 5 to 30% by weight.

Also, it is preferable that a vinyl-based monomer having a carboxyl group is in an amount of 0.5 to 25% by weight based on the whole used vinyl-based monomers (a), and more preferable that it is in an amount of 1 to 10% by weight.

The vinyl-based monomer (a), as mentioned above, is not especially limited as far as it is a vinyl-based monomer hitherto known in public, but, for example, in a case where the transparency, weather resistance, water resistance and so forth are required, it is preferable that a (meth) acrylic acid-based monomer is a main component. In this case, it is preferable that the (meth)acrylic acid-based monomer is contained in an amount of 40% or more by weight based on the whole vinyl-based monomers (a).

Also, in a case where luster, paint film hardness and the like are required, it is preferable to use an aromatic vinyl-based monomer. In this case, it is preferable that the aromatic vinyl-based monomer is contained in an amount of 40% or more by weight based on the whole vinyl-based monomers (a).

Furthermore, in a case where water-repelling and oil-repelling performance and pollution-preventive performance and the like are required, it is preferable to use a fluorine-containing vinyl-based monomer. In this case, it is preferable that the fluorine-containing vinyl-based monomer is contained in an amount of 10% or more by weight based on the whole vinyl-based monomers (a).

Still further, in a case where adhesive performance with an inorganic material and pollution-preventive performance and the like are required, it is preferable to use a silicon-containing vinyl-based monomer. In this case, it is preferable that the silicon-containing vinyl-based monomer is contained in an amount of 10% or more by weight based on the whole vinyl-based monomers (a).

In this invention, an alcohol used as the alcohol (b) having no addition-polymerization reactivity may be either a monofunctional alcohol having only one hydroxyl group per one molecule or a polyfunctional alcohol having two or more of a hydroxyl group per one molecule, and furthermore, it may be a mono- or polyfunctional alcohol which has a multiple bond in the molecule and which is hard to undergo an addition polymerization reaction. However, the aforementioned vinyl-based monomer having hydroxyl group is not included in the alcohol (b) having no addition-polymerization reactivity. Furthermore, the monofunctional alcohol and polyfunctional alcohol may be jointly used. The monofunctional alcohol is not especially limited, however, there are cited, for example, one kind or two or more kinds selected from ethyl alcohol, methyl alcohol, propyl alcohol, butyl alcohol, isobutanol, tertiary-butyl alcohol, pentyl alcohol, a higher alcohol of $C_{12}$ to $C_{14}$, methoxyethanol, ethoxyethanol, propoxyethanol, ethylene glycol monoacetate, cyclohexanol, benzyl alcohol, phenethyl alcohol and the like. The polyfunctional alcohol is not especially limited, however, there are cited, for example, one or two or more kinds selected from: alkylene glycols such as ethylene glycol, 1,2-propanediol, 1,3propanediol, 1,2-butanediol, 1,3-butanediol, 1,4-butanediol, 2,3-butanediol, 1,2-pentanediol, 1,3-pentanediol, 1,4-pentanediol, neopentyl glycol, 1,5-pentanediol, 2,3-pentanediol, 2,4-pentanediol, 1,6-hexanediol and the like; hydroquinone diethylol ether; ethylene glycol derivatives such as diethylene glycol, triethylene glycol and the like; aliphatic polyfunctional alcohols such as sorbitol, cyclohexanediol, xylylenediol and the like; glycerol and mono- or disubstituted derivatives thereof consisting of glycerol fatty acid esters such as monoacetin, monolaurin, monoolein, monopalmitin, monostearin and the like and glycerol monoethers such as thymyl alcohol, glycerol monomethyl ether, butyl alcohol and the like; trimethylolpropane and mono- or disubstituted derivatives thereof; pentaerythritol and mono- to trisubstituted derivatives thereof such as pentaerythritol dioleate and pentaerythritol distearate; a sorbitan fatty acid ester; saccharides consisting of monosaccharides such as erythritol, threose, ribose, arabinose, xylose, lyxose, allose, aldose, glucose, mannose, gulose, idose, galactose, talose, fructose, apiose, rhamnose, psicose, sorbose, tagarose, ribulose, xylulose and the like, disaccharides such as sucrose, realrose, lactose and the like; and the like. These alcohol (b) having no addition-polymerization reactivity may be properly selected according to the use of the polymer (A) to be obtained. For example, in a case where the polymer (A) is used as a raw material for a thermoplastic resin composition or a thermoplastic polymer, use of a monofunctional alcohol is preferable and, in a case where the polymer (A) is used as a raw material for a thermosetting resin composition or a thermosetting polymer, use of a polyfunctional alcohol is preferable. Furthermore, if viscosity in the course of a polymerization reaction is low, uniformity of the reaction system increases. Therefore, a low molecular weight is preferable for the alcohol (b) having no addition-polymerization reactivity. For example, the molecular weight is preferably 400 or lower and, more preferably, 200 or lower.

Furthermore, among the above-mentioned alcohols (b), preferable ones are ethylene glycol, 1,2-propanediol, isobutanol, 1,4-butanediol, trimethylolpropane, glycerol, pentaerythritol and sorbitol, and especially, more preferable ones are ethylene glycol, 1,2-propanediol and isobutanol.

The alcohol (b) having no addition-polymerization reactivity is not limited to such as containing only carbon, hydrogen and oxygen as constituent elements. For example, it may be such as containing a nitrogen or sulfur element in addition to the aforementioned three elements.

The nitrogen-containing alcohol is not especially limited, however, there can be cited, for example, amine-based polyfunctional alcohols such as phenyldiethanolamine, triethanolamine, triisopropanolamine, diethanolamine, diisopropanolamine, tris(hydroxymethylamino) methane and the like; tris(hydroxy)cyanuric acid and the like.

As the sulfur-containing alcohol there can be used alcohols having various kinds of bonds containing a sulfur element, for example, a C=S bond, a C—S—C bond, a $SO_2$ bond, a $SO_3$ bond, a SH bond, a $S_n$ bond ($n \geq 2$) or the like.

A usable sulfur-containing alcohol is not especially limited, however, there are cited, for example, mercaptoethanol, methanesulfonylethanol, methylmercaptoethanol, ethylmercaptoethanol, thiodiethylene glycol, 2-hydroxyethyl disulfide, thiodiethylene glycol, ethylene bis (2-hydroxyethyl) sulfide, bis(hydroxyethyl) sulfone, N,N-bis(2-hydroxyethyl)taurine and a metal salt thereof, laurylthiopropionic acid thiodiethanolamine salt, an ethylene oxide adduct of thioethylene glycol, bis(2-hydroxyethyl)bisphenol-S, bis (2-hydroxyethyl) tetrabromobisphenol-S, bis(2-hydroxyethyl) tetramethylbisphenol-S, bis(2-hydroxyethyl)diphenylbisphenol-S, bis(2-hydroxyethyl)thiodiphenol and the like.

The number of terminal functional groups can be easily controlled by selecting properly the kind of alcohols (b). As a result, without using jointly a vinyl-based monomer having a functional group and without damaging the toughness, weather resistance and water resistance which are characteristics of polymers having terminal functional groups, it becomes possible to obtain crosslinking density so that a crosslinked matter has balanced performance.

A suitable ratio by weight of the alcohol (b) having no addition-polymerization reactivity to the vinyl-based monomer (a) (alcohol (b) having no addition-polymerization reactivity: vinyl-based monomer (a)) is different according to polymerization conditions and polymerization composition, however, a preferable ratio is in a range of from 1:20 to 20:1 and a more preferable one is in a range of from 1:10 to 10:1. Furthermore, a ratio of the alcohol (b) having no addition-polymerization reactivity to the initiator (c) is different according to polymerization conditions and polymerization composition, however, the (b) is preferably 2 mole times or more of the (c) and, more preferably, 50 mole times or more.

A peroxide used for the initiator (c) used in this invention and consisting essentially of a peroxide is not especially limited, however, there are cited, for example, hydrogen peroxide adducts such as sodium peroxide, potassium peroxide, barium peroxide, cesium peroxide, calcium peroxide, magnesium peroxide, strontium peroxide, hydrogen peroxide, sodium percarbonate and the like; ketone peroxides such as methyl ethyl ketone peroxide, cyclohexanone peroxide, 3,3,5-trimethylcyclohexanone peroxide, methylcyclohexanone peroxide, methylacetoacetate peroxide, acetylacetone peroxide and the like; peroxyketals such as 1,1-bis(tertiary-butylperoxy)-3,3,5-trimethylcyclohexane, 1,1-bis(tertiarybutylperoxy)cyclohexane, 2,2-bis(tertiarybutylperoxy)octane, n-butyl-4,4-bis (tertiary-butylperoxy) valerate, 2,2-bis(tertiary-butylperoxy)butane and the like; hydroperoxides such as tertiary-butyl hydroperoxide, cumene hydroperoxide, diisopropylbenzene hydroperoxide, 2-(4-methylcyclohexyl)propane hydroperoxide, 2,5-dimethylhexane-2,5-dihydroperoxide, 1,1,3,3-tetramethylbutyl hydroperoxide and the like; dialkyl peroxides such as di-tertiary-butyl peroxide, tertiary-butylcumyl peroxide, dicumyl peroxide, α, α'-bis(tertiary-butylperoxy-m-isopropyl) benzene, 2,5-dimethyl-2,5-di(tertiary-butylperoxy)hexane, 2,5-dimethyl-2,5-di(tertiary-butylperoxy)hexyne-3 and the like; diacyl peroxides such as acetyl peroxide, isobutylyl peroxide, octanoyl peroxide, decanoyl peroxide, lauroyl peroxide, 3,5,5-trimethylhexanoyl peroxide, succinic acid peroxide, benzoyl peroxide, 2,4-dichlorobenzoyl peroxide, m-toluyl peroxide and the like; peroxy dicarbonates such as diisopropylperoxy dicarbonate, di-2-ethylhexylperoxy dicarbonate, di-n-propylperoxy dicarbonate, bis- (4-tertiary-butylcyclohexyl)peroxy dicarbonate, dimyristylperoxy dicarbonate, di-2-ethylhexylperoxy dicarbonate, di-methoxyisopropylperoxy dicarbonate, di(3-methyl-3-methoxybutylperoxy) dicarbonate, diallylperoxy dicarbonate and the like; peroxy esters such as tertiary-butylperoxy acetate, tertiary-butylperoxy isobutylate, tertiary-butylperoxy pivalate, tertiary-butylperoxy neodecanoate, cumylperoxy neodecanoate, tertiary-butylperoxy 2-ethylhexanoate, tertiary-butylperoxy 3,5,5-trimethylhexanoate, tertiary-butylperoxy laurate, tertiary-butylperoxy benzoate, di-tertiary-butylperoxy isophthalate, 2,5-dimethyl-2,5-di(benzoylperoxy)hexane, tertiary-butylperoxy maleate, tertiary-butylperoxy isopropyl carbonate, cumylperoxy octoate, tertiary-hexylperoxy pivalate, tertiary-butylperoxy neohexanoate, tertiary-hexylperoxy neohexanoate, cumylperoxy neohexanoate and the like; acetylcyclohexylsulfonyl peroxide, tertiary-butylperoxy ally carbonate and the like. Especially, preferable peroxides are hydrogen peroxide, cyclohexanone peroxide, di-tertiary-butyl peroxide and benzoyl peroxide. Among them, more preferable peroxides are hydrogen peroxide, cyclohexanone peroxide, benzoyl peroxide. The peroxides may be used either as one kind alone or in combination of plural kinds.

As the hydrogen peroxide used in this invention there can be used aqueous hydrogen peroxide which is an industrially available aqueous solution. In this case, it is preferable that the amount of water is about 10% by weight or less based on the amount of whole components in a reactor.

As the initiator (c) used in this invention and consisting essentially of a peroxide are cited, for example, a case where a compound (e) capable of accelerating a polymerization reaction by combining it with the peroxide is used together with the peroxide and a case where the peroxide is used alone. As the compound (e) are cited a catalyst for decomposing a peroxide, a reductive compound undergoing an oxidation-reduction (redox) reaction with a peroxide, and the like. That is, the initiator (c) consisting essentially of a peroxide may consist of either an essential peroxide alone, or a mixture containing a peroxide as an essential component and further containing one or two or more kinds of compounds, capable of accelerating a polymerization reaction, selected from a group consisting of the catalyst for decomposing a peroxide and the reductive compound.

Hereinafter, the compound (e) capable of accelerating a polymerization reaction by combining it with a peroxide are explained practically.

The catalyst for decomposing a peroxide, which is an example of the compound (e), is not especially limited, however, there are cited, for example, metal halides such as lithium chloride, lithium bromide and the like; metal oxides such as titanium oxide, silicon dioxide and the like; inorganic acids such as hydrochloric acid, sulfuric acid, nitric acid, perchloric acid, hydrobromic acid and the like and metal salts thereof; carboxylic acids such as formic acid, acetic acid, propionic acid, butyric acid, isobutyric acid, benzoic acid and the like and metal salts and esters thereof; heterocyclic amines such as pyridine, indole and derivatives thereof, imidazole and derivatives thereof, carbazole and derivatives thereof; and the like. These may be used either as one kind alone or in combination of plural kinds.

The reductive compound undergoing an oxidation-reduction reaction with a peroxide, which is an example of the compound (e), is not especially limited, however, there are cited, for example, organometallic compounds such as ferrocene and the like; inorganic compounds such as inorganometallic compounds exemplified by iron naphthenate, copper naphthenate, nickel naphthenate, cobalt naphthenate, manganese naphthenate and the like, which are capable of generating metal ions such as iron, copper, nickel, cobalt, manganese and the like, inorganic compounds such as a boron trifluoride ether adduct, potassium permanganate, perchloric acid and the like; sulfur-containing compounds such as sulfur dioxide, sulfurous acid salts, mono- or dialkyl esters of sulfuric acid, mono- or diallyl esters of sulfuric acid, hydrogen sulfites, thiosulfates, sulfoxylates, homologues of cyclic sulfinic acids such as benzenesulfinic acid, substituted benzenesulfinic acid, p-toluenesulfinic acid and the like; mercapto compounds such as octyl mercaptan, decyl mercaptan, dodecyl mercaptan, mercaptoethanol, α-mercaptopropionic acid, thioglycolic acid, thiopropionic acid, an ester of α-thiopropionic acid with sodium sulfopropionate, an ester of α-thiopropionic acid with sodium sulfoethylate and the like; nitrogen-containing compounds such as hydrazine, β-hydroxyethylhydrazine, hydroxylamine and the like; aldehydes such as formaldehyde, acetoaldehyde, propionaldehyde, n-butyraldehyde, isobutyraldehyde, isovaleraldehyde and the like; ascorbic acid and the like. These may be used either as one kind alone or in combination of plural kinds.

The initiator (c) is not limited to the above-mentioned examples. For example, a peroxide or a peroxide and the above-mentioned compound (e) can be used jointly with one or two or more kinds of radical initiators which are hitherto known in public and exemplified by azo type initiators such as AIBN (azobis(isobutyronitrile)) and the like.

An amount for use of the initiator (c) is determined automatically according to the molecular weight of an aimed polymer (A), however, generally, a preferable amount is in a range of from 0.01 to 20% by weight based on the vinyl-based monomer (a).

A catalyst (d) used in this invention is at least one selected from a group consisting of an organic sulfonic acid compound having no addition-polymerization reactivity and an inorganic acid.

The organic sulfonic acid compound having no addition-polymerization reactivity is an organic sulfonic acid compound which has no bond capable of addition-polymerization such as a carbon-carbon double bond, a carbon-carbon triple bond and the like in the molecule and which is not especially limited. However, there are cited, for example, aliphatic sulfonic acids such as methanesulfonic acid, ethanesulfonic acid, propanesulfonic acid, octanesulfonic acid and the like; aromatic sulfonic acids such as benzenesulfonic acid, benzenedisulfonic acid, naphthalenesulfonic acid, naphthalenedisulfonic acid and the like; aromatic sulfonic acids having an aromatic ring-substituted group, such as chlorobenzenesulfonic acid, 1-naphthol-4-sulfonic acid, 2-naphthylamine-6-sulfonic acid, p-toluenesulfonic acid, dodecylbenzenesulfonic acid and the like; alicyclic sulfonic acid, an ion exchange resin such as AMBERLYST 15, made by ORGANO, and the like. These may be used either as one kind alone or in combination of plural kinds.

Among such organic sulfonic acid compounds having no addition-polymerization reactivity as shown above, preferable ones are especially methanesulfonic acid, benzenesulfonic acid, dodecylbenzenesulfonic acid, p-toluenesulfonic acid and the like. Among them, especially effective ones are dodecylbenzenesulfonic acid and p-toluenesulfonic acid.

The inorganic acid used in this invention is not especially limited, however, there are cited, for example, hydrochloric acid, hydrofluoric acid, hydrobromic acid, hydroiodic acid, perchloric acid, chlorous acid, hypochlorous acid, periodic acid, sulfuric acid, fuming sulfuric acid, sulfurous acid, nitric acid, fuming nitric acid, manganic acid, permanganic acid, chromic acid, dichromic acid, phosphoric acid, phosphorous acid, hypophosphorous acid, polyphosphoric acid, hypophosphoric acid, orthophosphoric acid, metaphosphoric acid, pyrophosphoric acid, and furthermore, solid acids such as heteropolyacids, silica, silica alumina, zeorite, titanium oxide and the like. Among these, sulfuric acid and hydrochloric acid are preferable.

Such organic sulfonic acid compounds having no addition-polymerization reactivity and inorganic acids as shown above may be used either as one kind alone or in combination of plural kinds.

A preferable amount for use of at least one of catalysts (d) selected from a group consisting of an organic sulfonic acid compound having no addition-polymerization reactivity and an inorganic acid is in a range of from 0.05 to 10% by weight based on the whole polymerization system. Furthermore, a method of adding the catalyst (d) may be any one industrially used. For example, the catalyst (d) can be added in one lot before, during or after temperature-raise, or it can be optionally added during a polymerization reaction.

The production process of this invention is arranged in the course of reaction and in a reactor so that there is not substantially used any component other than the vinyl-based monomer (a), the alcohol (b) having no addition-polymerization reactivity, the initiator (c) consisting essentially of a peroxide, and the catalyst (d) of at least one selected from a group consisting of an organic sulfonic acid compound having no addition-polymerization reactivity and an inorganic acid.

In practice, the amount of the component other than the vinyl-based monomer (a), the alcohol (b) having no addition-polymerization reactivity, the initiator (c) consisting essentially of a peroxide, and the catalyst (d) of at least one selected from a group consisting of an organic sulfonic acid compound having no addition-polymerization reactivity and an inorganic acid is regulated to about 10% by weight or smaller of the whole. preferable amount of the component other than the (a), (b), (c) and (d) is 5% by weight or smaller and the most preferable one is no inclusion of the component other than the (a), (b), (c) and (d).

However, it is allowable to use a surfactant (x) as the component other than the (a), (b), (c) and (d) in an amount smaller than 10% by weight based on the amount of whole components in a reactor, because in this case the introduction of a hydroxyl group into an obtained polymer (A) may be increased, but is not decreased.

The surfactant (x) is not especially limited, however, there are cited, for example, quaternary ammonium salts such as triethylbenzylammonium chloride, tetraethylammonium chloride, triethylbenzylammonium bromide, trioctylmethylammonium chloride, tributylbenzylammonium chloride, trimethylbenzylammonium chloride, N-laurylpyridinium chloride, trimethylbenzylammonium hydroxide, tetramethylammonium hydroxide, trimethylphenylammonium bromide, tetramethylammonium bromide, tetraethylammonium bromide, tetra-n-butylammonium bromide, tetra-n-butylammonium hydrogen sulfate, N-benzylpicolinium chloride, tetramethylammonium iodide, tetra-n-butylammonium iodide, N-lauryl-4-picolinium chloride, N-lauryl-4-picolinium chloride and the like; phosphonium salts such as tetrabutylphosphonium chloride and the like; sulfonium salts such as trimethylsulfonium iodide and the like; and other kinds of onium salts; or a polyoxyethylene-polypropylene oxide block copolymer; polyoxyethylene-based surfactants such as polyoxyethylene sulfuric acid esters and the like; higher alcohols such as lauryl alcohol, stearyl alcohol and the like; and sulfuric acid esters of these higher alcohols and metal salts of the sulfuric acid esters; higher fatty acids such as lauric acid, stearic acid and the like and metal salts and sorbitan esters thereof. These may be used either as one kind alone or in combination of plural kinds.

In a case of using the surfactant (x), its amount for use is smaller than 10% by weight based on the amount of whole components in a reactor and, preferably, in a range of from 0.1 to 5% by weight. If the surfactant (x) is used in a 10% amount by weight or larger based on the amount of whole components in a reactor, the average number (Fn(OH)) of terminal hydroxyl groups of an obtained polymer (A) is unpreferably decreased by a side reaction such as a reaction of chain transfer to the surfactant (x).

Among the above-mentioned surfactants (x), a surfactant itself having a hydroxyl group at both terminals such as the polyoxyethylene-polypropylene oxide block copolymer is preferable, because it is assembled into a crosslinked structure, so that the toughness, weather resistance and water resistance of a crosslinked matter are not badly affected and processes of purification and elimination are unnecessary.

Even if the amount for use of the component other than the (a), (b), (c) and (d) is about 10% by weight or smaller based on the amount of whole components in a reactor, once it is used, there is a possibility that probability of introducing a hydroxyl group to the terminals decreases. However, in some cases, viscosity in a system decreases by charging the component other than the (a), (b), (c) and (d) in an amount of approximately 10% by weight or smaller based on the amount of whole components in a reactor, so that such effects as heat-elimination and the like due to latent heat of evaporation are obtained, which are preferable in an aspect of operations for production.

A vessel for polymerization (a reactor in which a polymerization reaction is performed) used in this invention may be a batch type such as a conventional tank type reactor, kneader and the like. Also, a piston-flow tube type and, depending upon viscosity of a polymer, a continuous type such as a twin screw extruder, a continuous type kneader and the like may be used. Also, a semi-batch type reactor can be used with no problem at all, however, a tube type reactor, an extruder, a continuous type kneader and the like are preferably used from standpoints that the concentration ratios of each additive in a reactor can be easily controlled by adding the additive anywhere on the way of a tube, that the residence time is constant, and that the productivity is excellent. Concerning proper use of the tube type reactor, extruder and continuous type kneader, the tube type reactor is preferably used in a case where the reaction mixture shows low viscosity after completion of the polymerization, and the extruder or continuous type kneader is preferably used in a case where the reaction mixture shows relatively high viscosity after completion of the polymerization.

Furthermore, for a part of these apparatuses, which comes in contact with aliquid, there should be selected appropriate quality of materials and, generally, as the materials there can be cited SUS 316, 304 L, Teflon, aluminum, glass and the like. Among these, preferable ones are Teflon, aluminum and glass, and the most preferable ones are Teflon, aluminum and glass.

The tube type reaction group so far publicly known has no especial limitation, however, there are cited a single tube type or multi-tube type, or a mixer having no mobile part or a mixer having a mobile part. For example, there are cited a mixer having no mobile part such as Static Mixer (made by Noritake Co., Ltd.), Sulzer Mixer (made by Sumitomo Jyukikai Kogyo Co., Ltd.) and the like and a mixer having a mobile part such as an extruder, a continuous type kneader and the like.

In this invention, it is possible to perform the reaction under normal pressure as well as an increased pressure in an autoclave, an extruder or the like.

Polymerization temperature in the production process of this invention has no especial limitation and there is no problem at all if the temperature is in a range of about from room temperature to 200° C., in which a usual radical polymerization reaction is performed.

In the production process of this invention there is a case where a process of removing an excess of the alcohol (b) having no addition-polymerization reactivity is required after completion of the polymerization. On this occasion, if the used alcohol (b) having no addition-polymerization reactivity is compatible with the formed polymer (A), it is possible to remove the alcohol (b) having no addition-polymerization reactivity by performing devolatilization under reduced pressure by using a reaction vessel, a thin membrane evaporator, a twin screw extruder, or the like. If the used alcohol (b) having no addition-polymerization reactivity is not compatible with the formed polymer (A), most of the alcohol (b) having no addition-polymerization reactivity is removed either by standing under a static condition to result in separation of a reaction mixture obtained from completion of the polymerization or by adding a solvent capable of dissolving the polymer (A), but not the alcohol (b), into the reaction mixture to decrease the viscosity of a polymer layer, followed by standing under a static condition to result in separation of the reaction mixture, and then, the residual alcohol (b) can be removed by liquid-liquid extraction or devolatilization under reduced pressure.

Even when any apparatus industrially used for the devolatilization under reduced pressure is employed, the devolatilization under reduced pressure can be performed. As practical examples of such an apparatus are cited a reaction vessel equipped with a condenser, and a flash tank, a stripper, a twin screw extruder, a thin membrane evaporator and the like.

In the production process of this invention, because the acidic catalyst (d) is used, properties of the formed polymer (A) may be changed by the acidic catalyst (d) after the polymerization reaction. Therefore, it is preferable to perform a neutralization reaction after the polymerization.

The molecular weight of the polymer (h) produced by this invention is not especially limited, however, it is preferable that the number-average molecular weight is in a range of from 500 to 100,000 in order to display the feature resulting from having a reactive hydroxyl group at a terminal, and it is more preferable that the number-average molecular weight is in a range of from 1,000 to 50,000.

Concerning the average number (Fn(OH)) of terminal hydroxyl groups of the polymer (A) produced by this invention, if it is 1.8 times or more of the number of hydroxyl groups of the used alcohol (b) (the number of hydroxyl groups per one molecule of the alcohol), physical properties almost similar to ideal ones (2 times) can be very preferably displayed. Furthermore, if the average number is 1.5 times or more, physical properties close to fairly ideal ones can be displayed. For example, in a case where the alcohol (b) is a bifunctional alcohol such as ethylene glycol and the like (the number of hydroxyl groups per one molecule of the alcohol is 2), the Fn(OH) of the polymer (A) is ideally 4.0, however, if it is in a range of from 3.6 to 4.0, physical properties almost similar to ideal ones can be very preferably displayed. If the Fn(OH) is at least 3.0, physical properties close to fairly ideal ones can be displayed. Furthermore, in a case where the alcohol (b) is a monofunctional alcohol such as ethylene glycol monoacetate, isobutanol and the like (the number of hydroxyl groups per one molecule of the alcohol is 1), the (Fn(OH)) of the polymer (A) is ideally 2.0, however, it is very preferably in a range of from 1.8 to 2.0 and it is preferably at least 1.5.

The polymer (A) produced by the production process of this invention is able to convert the hydroxyl group at a terminal, by using an organic reaction and the like hitherto-known in public, into a useful terminal functional group such as an amino group, a carboxyl group, a polymerizable unsaturated group like a vinyl group etc., an epoxy group, a silanol group, an alkoxysilyl group, a hydrosilyl group, a mercapto group, an oxazoline group, a lactone group, an azlactone group, an ethynyl group, a maleimide group, a formyl group, bromine, chlorine and the like.

Next, a composition consisting essentially of the polymer produced by this invention is explained.

This composition is such as containing the polymer (A) as well as a compound (f) having two or more of a functional group capable of reacting with a hydroxyl group per one molecule as essential components. The polymer (A) may be used either as one kind alone or in combination of two or more kinds. Also, a weight ratio between the polymer (A) and the compound (f) contained in this composition (polymer (A)/compound (f)) is not especially limited, however, a preferable ratio is in a range of from 9.99/0.01 to 40/60 and more preferable one is in a range of from 99.9/0.1 to 60/40.

This composition, in addition to the polymer (A), may contain a low molecular weight compound having a hydroxyl group hitherto-known in public or a polymer having a hydroxyl group hitherto-known in public (a polymer polyol, an acrylic polyol, a polyether polyol, a polyester polyol, a polycarbonate polyol, a polybutadiene polyol, a polyolefine polyol and the like).

The compound (f) having two or more of a functional group capable of reacting with a hydroxyl group per one molecule is not especially limited, however, there are cited, for example, a compound (g) having two or more of an isocyanate group per one molecule; an amino plastoresin (h) such as methylolated melamines, alkyl ether derivatives of the melamines, low-condensation compounds of the melamines (the term "low-condensation compound(s)" used herein is employed to mean "compounds made by comprising several, not many repeats of condensation reaction(s)"), and the like; a polyfunctional carboxylic acid and derivatives thereof (i) such as a carboxylic acid having two or more of a carboxyl group per one molecule, acid halides thereof and the like; and the like.

The compound (g) having two or more of an isocyanate group per one molecule is a so-called polyfunctional isocyanate compound. Any one of the polyfunctional isocyanate compounds hitherto-known in public can be used. There are cited, for example, isocyanate compounds such as tolylene diisocyanate (which may be said as "TDI"), diphenylmethane 4,4′-diisocyanate (which may be said as "MDI"), hexamethylene diisocyanate, xylylene diisocyanate, m-xylylene diisocyanate, naphthalene 1,5-diisocyanate, hydrogenated diphenylmethane diisocyanate, hydrogenated tolylene diisocyanate, hydrogenated xylylene diisocyanate, isophorone diisocyanate and the like; buret polyisocyanate compounds such as Sumidur N (made by Sumitomo-Bayer Urethane Co., Ltd.); polyisocyanate compounds having an isocyanurate ring such as Desmodur IL, HL (made by Bayer A.G.) and Colonate EH (made by Nippon Polyurethane Kogyo Co., Ltd.); adduct polyisocyanate compounds such as Sumidur L (made by Sumitomo-Bayer Urethane Co., Ltd.), adduct polyisocyanate compounds such as Colonate HL (made by Nippon Polyurethane Kogyo Co., Ltd. ); POLYFLEX SL265 (DAIICHI KOGYO SEIYAKU) which is polypropylene glycol of which terminal has been converted into an isocyanate group, SANPRENE SP-2002, SP-2005 (SANYO KASEI); and the like. These may be used either alone or in combination of two or more kinds. Also, a block isocyanate may be used.

In order to utilize superior weather resistance of a composition made by containing the polymer (A) and a polyfunctional isocyanate compound (g), preferable examples of the polyfunctional isocyanate compound (g) are isocyanate compounds not having an aromatic ring such as hexamethylene diisocyanate, hydrogenated diphenylmethane diisocyanate, Sumidur N (made by Sumitomo-Bayer Urethane Co., Ltd.) and the like.

The formulating ratio between the polymer (A) and the polyfunctional isocyanate compound (g) is not especially limited, however, for example, it is preferable that a ratio between the isocyanate group of compound (g) and the hydroxyl group of polymer (h) (NCO/OH (mole ratio)) is in a range of from 0.1 to 1.0, and more preferable that the ratio is in a range of from 0.8 to 1.2.

Furthermore, in order to accelerate a conversion reaction into an urethan between the polymer (A) and the polyfunctional isocyanate compound (g) which are components in the composition, as occasion demands, a catalyst known in public such as an organic tin compound, a tertiary amine and the like is freely used.

The amino plastoresin (h) is not especially limited, however, there are cited, for example, a reaction product (a methylolated compound) between a triazine ring-containing compound shown by the below-mentioned general formula (I) and formaldehyde, a low-condensation compound between the triazine ring-containing compound and formaldehyde, and derivatives thereof, and furthermore, an urea resin, a reaction product (a methylolated compound) between the urea resin and formaldehyde, a low-condensation compound between the urea resin and formaldehyde, derivatives thereof and the like.

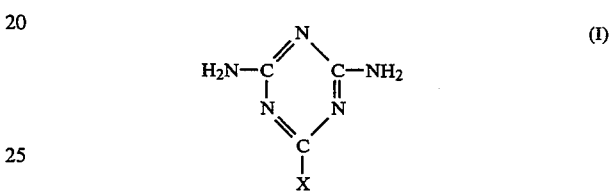

The triazine ring-containing compound shown by the above general formula (I) is not especially limited, however, there can be cited, for example, melamine, benzoguanamine, cyclohexanecarboguanamine, methylguanamine, vinylguanamine and the like. These may be used either as one kind alone or in combination of two or more kinds.

The reaction product between the aforementioned triazine ring-containing compound and formaldehyde and derivatives thereof are not especially limited, however, there are cited, for example, hexaméthoxymethylmelamine, tetramethoxymethylbenzoguanamine and the like. Furthermore, the low-condensation compound between the aforementioned triazine ring-containing compound and formaldehyde and derivatives thereof are not especially limited, however, there are cited, for example, a low-condensation compound in which several of the aforementioned triazine ring-containing compound are combined through either one or both of the —NH—CH$_2$—O—CH$_2$—NH—bond and the —NH—CH$_2$—NH— bond, an alkyl-etherated formaldehyde resin (Cymel, made by Mitsui Cyanamide Co., Ltd. ) and the like. These amino plastoresins (h) may be used either as one kind alone or in combination of two or more kinds.

A ratio between the aforementioned triazine ring-containing compound and formaldehyde, which are used in synthesizing the amino plastoresin (h) exemplified before, differs depending upon the use, however, a preferable mole ratio between the triazine ring-containing compound and formaldehyde (triazine ring-containing compound/formaldehyde) is in a range of from 1 to 6 and more preferable one is in a range of from 1.5 to 6.

In a composition containing, as essential components, the polymer (A) and the amino plastoresin (h) as the compound (f), a preferable ratio (weight ratio) between the polymer (A) and amino plastoresin (h) is in a range of from 95:5 to 50:50 and more preferable one is in a range of from 80:20 to 60:40.

In the composition containing the polymer (A) and amino plastoresin (h) as essential components, in order to accelerate a reaction, a catalyst hitherto-known in public such as p-toluenesulfonic acid, benzenesulfonic acid and the like is freely usable.

The polyfunctional carboxylic acid and derivatives thereof (i) are not especially limited, however, there are cited, for example, a polyfunctional carboxylic acid and anhydride thereof, such as oxalic acid, malonic acid, succinic acid, glutaric acid, adipic acid, phthalic acid, phthalic anhydride, terephthalic acid, trimellitic acid, trimellitic anhydride, pyromellitic acid, pyromellitic anhydride, maleic acid, maleic anhydride, fumaric acid, itaconic acid, diphenic acid, naphthalenedicarboxylic acid and the like, acid halides of these compounds, a polymer having plural carboxyl groups, and the like. The polyfunctional carboxylic acid and derivatives thereof (i) may be used as one kind alone or in combination of two or more kinds. A preferable ratio between the number of functional groups of polyfunctional carboxylic acid and derivatives thereof (i) and the number of hydroxyl groups of polymer (A) is in a range of from 0.3 to 3 and more preferable one is in a range of from 0.5 to 2.

In a case where the composition containing the polymer (A) and the compound (f) having two or more of a functional group capable of reacting with a hydroxyl group per one molecule as essential components (hereinafter, this composition may be simply referred to as "composition (A)") is used as a sealant composition, a preferable molecular weight (weight-average molecular weight) of the polymer (A) is in a range of from 1,000 to 1,000,000.

In a case of using the composition (A) as a sealant composition, in the composition (A) there may be contained, as occasion demands, the following compounds hitherto-known in public: polyols (high molecular weight polyols other than the polymer (A) and the like), a polyisocyanate (for example, TDI, MDI, POLYFLEX SL265 (DAIICHI KOGYO SEIYAKU) which is polypropylene glycol of which terminal has been converted into an isocyanate group, SANPRENE SP-2002, SP-2005 (SANYO KASEI) and the like), a catalyst (for example, an amine-based, a tin-based, a lead-based and the like), an inorganic filler (for example, calcium carbonate, talc, clay, silica, carbon black, titanium white and the like), a plasticizer (for example, dioctyl phthalate (which may be said as DOP), di-isodecyl phthalate (which may be said as DIDP), dioctyl adipinate (which may be said as DOA) and the like), an antisagging agent (for example, colloidal silica, hydrogenated castor oil, organic bentonite, surface-processed calcium carbonate and the like), an antiaging agent (for example, hindered phenols, benzotriazols, hindered amines and the like), a foaming inhibitor (for example, a dehydrating agent, a carbon dioxide absorbent and the like) and so forth.

Furthermore, in a case where a polymer produced by converting a hydroxyl group of the polymer (A), which is obtained from the production process of this invention, into a hydroxysilyl, an alkoxysilyl or a mercapto group is used as an essential component of a sealant composition, the sealant composition becomes such as having a crosslinking system different from that of an urethane.

In the production process of this invention, a polymerization reaction of the vinyl-based monomer (a) is carried out in the presence of the alcohol (b) having no addition-polymerization reactivity by using the initiator (c) consisting essentially of a peroxide and further using at least one of catalysts (d) selected from a group consisting of the organic sulfonic acid compound having no addition-polymerization reactivity and the inorganic acid. In this case, into both terminals of a polymer formed by a polymerization reaction of the vinyl-based monomer (a) there is introduced a hydroxyl group easily and surely with good efficiency. As a result, it becomes possible that a polymer having a hydroxyl group at both terminals is easily obtained with a cheap price and good efficiency from a wide field of vinyl-based monomers including polar vinyl-based monomers.

Even if hydrogen peroxide or an organic peroxide having a hydroxyl group is used as a peroxide which is used as an essential component in the initiator (c), because a radical formed by decomposition and having a hydroxyl group is unstable, a side reaction such as a hydrogen-abstracting reaction (a chain transfer reaction), an oxidation reaction and the like is liable to occur and it is difficult to introduce a hydroxyl group surely into the polymer terminal by using solely the hydrogen peroxide or organic peroxide. However, by using the alcohol (b) having no addition-polymerization reactivity simultaneously, the reaction selectivity increases to some extent causing further introduction of hydroxyl groups, but this is still insufficient. However, if at least one of catalysts (d) selected from a group consisting of an organic sulfonic acid compound having no addition-polymerization reactivity and an inorganic acid is also allowed to coexist, the reaction selectivity increases and sure introduction of the hydroxyl group into both the terminals becomes possible. Furthermore, although the hydroxyl group cannot be introduced into both the terminals of a polymer by using only a peroxide other than hydrogen peroxide and an organic peroxide having a hydroxyl group, the introduction of hydroxyl group becomes partly possible by using the alcohol (b) having no addition-polymerization reactivity. Such only partial introduction of the hydroxyl group is due to the fact that, because an alkoxy radical (OR.) generated from the decomposition of a peroxide (ROOR) is very unstable, a side reaction such as a hydrogen-abstracting reaction (a chain transfer reaction) and the like is liable to occur, and to introduce surely the hydroxyl group into the polymer terminals is difficult. However, if at least one of the catalysts (d) selected from a group consisting of an organic sulfonic acid compound having no addition-polymerization reactivity and an inorganic acid is also allowed to coexist, the reaction selectivity increases and sure introduction of the hydroxyl group into both the terminals becomes possible.

Furthermore, the production process of this invention is arranged in such a manner that any component other than the aforementioned (a), (b), (c) and (d) is not substantially contained in a reactor. In practice, the amount of a component other than the (a), (b), (c) and (d) is controlled in an extent of 10% by weight or less of the whole. If the component (for example, a solvent) other than the (a), (b), (c) and (d) is contained in an extent more than 10% by weight of the whole, polymers not bearing the hydroxyl group at one terminal or both terminals at all are formed as by-products and, as a result, the number of terminal hydroxyl groups in a polymer decreases. However, it is allowable to use a surfactant (x) in an amount smaller than 10% by weight based on the amount of whole components in a reactor, because the introduction of a hydroxyl group into a produced polymer may be increased in this case, but is not decreased.

If a vinyl-based monomer in a wide field including polar vinyl-based monomers and, for example, 1,2-propanediol as the alcohol (b) having no addition-polymerization reactivity are used, there can be produced easily with a cheap price and good efficiency a polymer which has at each of both terminals two hydroxyl groups in total, that are different in reactivity and consist of one primary hydroxyl group and one tertiary hydroxyl group, and which can display characteristic performance.

The polymer (A) obtained by the production process of this invention has transparency, weather resistance, water resistance, hydrolysis resistance and chemical resistance by choosing optionally the sort of the vinyl-based monomer (a) which constitutes a main chain of the polymer (A). Furthermore, since various kinds of resins, such as polyester resins, polyurethane resins, polycarbonate resins and the like, and various kinds of block polymers and the like, derived from the composition containing the polymer (A), display features of very stretching (excellent bending processibility) and toughness, they are very useful as raw materials for a coating (a high solid coating, a low temperature curing coating, a water borne two-liquid type urethane coating, a water borne urethane coating, a powder coating and the like), an elastic wall material, waterproof for paint film, a pressure-sensitive adhesive, a floor material, a tackifier, an adhesive, binders (a magnetic recording medium, an ink binder, a casting binder, a burned brick binder, a graft material, a microcapsule, glass fiber sizing and the like), a sealant, urethane foam (hard, semihard, and soft type), urethane RIM, an UV-EB-curing resin, thermosetting type elastomer, a thermoplastic elastomer, microcellular, a fiber-processing agent, a plasticizer, a sound absorption material, a vibration-controlling material, a surfactant, a gel coat agent, a resin for artificial marble, an impact resistance-affording agent for artificial marble, a resin for ink, a film (a laminate adhesive, a protective film and the like), a resin for laminated glass, a reactive diluent, various molding materials, elastic fiber, artificial leather, synthetic leather, a dispersing agent, an aqueous urethane emulsion and the like, and furthermore, very useful as various kinds of resin additives, raw materials therefor and the like.

The polymer (A) can be easily converted into a polymer having another functional group (for example, a polymerizable unsaturated group, such as a vinyl group and the like, a formyl group, an amino group, a carboxyl group, an ethynyl group, an epoxy group, a silanol group, an alkoxysilyl group, a hydroxysilyl group, a mercapto group, an oxazoline group, a maleimide group, an azlactone group, a lactone group, bromine, chlorine and the like) at both terminals by carrying out a suitable reaction on both the terminal hydroxyl groups of the polymer (A). The thus-obtained polymers are also very useful. For example, a polymer having a carboxyl group at both terminals is very effective as an impact resistance-affording agent for epoxy adhesives and other uses. Furthermore, raw materials for surfactants, urethane foam, a water-reducing cement admixture, a compatibilizer and the like are obtained by adding a plural of ethylene oxide or propylene oxide to the terminal hydroxyl groups of the polymer (A).

In a case where the composition containing the polymer (A) and polyfunctional isocyanate compound (g) as essential components as well as the composition containing the polymer (A) and amino plastoresin (h) as essential components are used as a coating respectively, a very excellent paint film can be obtained, which is not only soft and tough, but also superior in weather resistance, water resistance, hydrolysis resistance, chemical resistance, hardness, heat resistance and the like. Furthermore, even if the polymer (A) is obtained as low molecular weight one, since a hydroxyl group exists at a terminal of the polymer (A), the poor toughness which is a defect of a conventional high solid coating can be improved.

In a case where the composition containing the polymer (A) and polyfunctional isocyanate compound (g) as essential components is used as a sealant there can be obtained a sealant which is very soft, tough, and superior in weather resistance, water resistance, chemical resistance, heat resistance and contamination resistance, and low in tack.

BEST MODE FOR CARRYING OUT THE INVENTION

Hereinafter, this invention is illustrated by the following examples of some preferred embodiments in comparison with comparative examples not according to the invention. However, this invention is not limited to the undermentioned examples. Furthermore, in the examples and comparative examples, the units "part(s)" and "%" denote "part(s) by weight" and "% by weight" respectively.

In the examples and comparative examples, unless otherwise noted, the values "polymerization conversion", "number-average molecular weight (Mn)", "average number (Fn(OH)) of terminal hydroxyl groups", "gel portion percent A", "gel portion percent B" and "average number $(Fn(OH)_{NCO})$ of terminal functional groups based on an isocyanate group" were determined by the following methods 1 to 6 respectively.

1. Polymerization conversion:

It was calculated from a residual ratio of each monomer by gas chromatography after completion of the polymerization.

2. Number-average molecular weight (Mn):

It was determined from a calibration curve based on standard polystyrene by using gel permeation chromatography (GPC).

3. Average number (Fn(OH)) of terminal hydroxyl groups:

It was calculated from an OH value (hydroxyl group value), determined according to JIS-K-1557, and the number-average molecular weight (Mn).

4. Gel portion percent A:

A mixture of an obtained polymer and Sumidur N-75 (a trifunctional isocyanate compound made by Sumitomo Bayer Urethane Co., Ltd.) was prepared so as to be 1.1/1 in a mole ratio of an isocyanate group to a hydroxyl group and then, an about 40% toluene solution of this mixture was prepared, to which a slight amount of dibutyltin dilaurate was added as a catalyst. The thus-prepared reaction mixture was, with well stirring, allowed to react at 80° C. for 3 hours to obtain a polyurethane film. Next, after dried sufficiently, the film was treated with a Soxhlet extractor for 8 hours by using tetrahydrofuran as a solvent and a % by weight of the unextracted remaining insoluble portion was shown as a gel portion percent A.

5. Gel portion percent B:

A mixture of an obtained polymer and Desmodur H (a bifunctional isocyanate compound made by Sumitomo Bayer Urethane Co., Ltd.) was prepared so as to be 1.05/1 in a mole ratio of an isocyanate group to a hydroxyl group and then, an about 40% toluene solution of this mixture was prepared, to which a slight amount of dibutyltin dilaurate was added as a catalyst. The thus-prepared reaction mixture was, with well stirring, allowed to react at 80° C. for 3 hours to obtain a polyurethane film. Next, after dried sufficiently, the film was treated with a Soxhlet extractor for 8 hours by using tetrahydrofuran as a solvent and a % by weight of the unextracted remaining insoluble portion was shown as a gel portion percent B.

6. Average number $(Fn(OH)_{NCO})$ of terminal functional groups based on an isocyanate group:

An obtained polymer was allowed to react with a somewhat excessive amount of phenyl isocyanate in the presence of a slight amount of a catalyst at 80° C. for 5 hours and then, the unreacted isocyanate was allowed to react with dibutylamine, and the residual amine was titrated by hydrochloric acid to determine a hydroxyl group concentration. From this concentration and a value of the above-measured number-average molecular weight (Mn) there was calculated the average number of terminal functional groups based on an isocyanate group.

On a basis of the average number $(Fn(OH)_{NCO})$ of terminal functional groups based on an isocyanate group, determined by this method, there can be determined the total number of hydroxyl groups including a low-reactive tertiary hydroxyl group as well, which cannot be measured by a method according to the JIS-K-1557. That is, the difference "$(Fn(OH)_{NCO})$ - $(Fn(OH))$" is the number of tertiary hydroxyl groups per one molecule of the polymer.

EXAMPLE 1-1

Into a flask equipped with a stirrer, nitrogen-introducing tube, thermometer and reflux condenser was charged 140 parts of ethylene glycol. An inside atmosphere of the flask was replaced by nitrogen, and then the temperature was raised up to 140° C. while introducing a nitrogen gas slowly. After the inside temperature of the reaction vessel became stable, a mixed liquid made by dissolving 2.0 parts of cyclohexanone peroxide in 40 parts of butyl acrylate and 60 parts of methyl methacrylate and another mixed liquid comprising 1.7 parts of dodecylbenzenesulfonic acid and 33 parts of ethylene glycol were added dropwise during 1 hour respectively, and then stirring was continued at 140° C. for 10 minutes to complete a polymerization reaction. The polymerization conversion was 92%.

Sequentially, an extracting solvent comprising toluene and water was used and a polymer was separated by extracting it from a reaction mixture containing the polymer, whereby a toluene solution containing the polymer was obtained. Toluene was removed by evaporating it, and furthermore, the residue was dried at 45° C. under a reduced pressure to obtain a purified polymer (1—1).

For the purified polymer (1—1), the number-average molecular weight (Mn) was 7,500 and the average number (Fn(OH)) of terminal hydroxyl groups was 4.4 (mole/polymer 1 mole).

EXAMPLE 1-2

Into a flask equipped with a stirrer, nitrogen-introducing tube, thermometer and reflux condenser was charged 140 parts of ethylene glycol. An inside atmosphere of the flask was replaced by nitrogen, and then the temperature was raised up to 140° C. while introducing a nitrogen gas slowly. After the inside temperature of the reaction vessel became stable, a mixed liquid made by dissolving 1.0 part of cyclohexanone peroxide and 0.8 parts of AIBN (azobis(isobutyronitrile)) in 40 parts of butyl acrylate and 60 parts of methyl methacrylate and another mixed liquid comprising 1.7 parts of dodecylbenzenesulfonic acid and 33 parts of ethylene glycol were added dropwise during 1 hour respectively, and then stirring was continued at 140° C. for 10 minutes to complete a polymerization reaction. The polymerization conversion was 95%.

Sequentially, the purification was performed in a manner similar to EXAMPLE 1-1 to obtain a polymer (1-2).

For the purified polymer (1-2), the number-average molecular weight (Mn) was 9,000 and the average number (Fn(OH)) of terminal hydroxyl groups was 3.6 (mole/polymer 1 mole).

EXAMPLE 1-3

Into a flask equipped with a stirrer, nitrogen-introducing tube, thermometer and reflux condenser was charged 140 parts of ethylene glycol. An inside atmosphere of the flask was replaced by nitrogen, and then the temperature was raised up to 140° C. while introducing a nitrogen gas slowly. After the inside temperature of the reaction vessel became stable, a mixed liquid made by dissolving 1.0 part of cyclohexanone peroxide and 1.7 parts of dodecylbenzenesulfonic acid in 40 parts of butyl acrylate and 60 parts of methyl methacrylate and another mixed liquid comprising 2.8 parts of a 60%, aqueous hydrogen peroxide solution and 33 parts of ethylene glycol were added dropwise during 1 hour respectively, and then stirring was continued at 140° C. for 10 minutes to complete a polymerization reaction. The polymerization conversion was 93%.

Sequentially, the purification was performed in a manner similar to EXAMPLE 1-1 to obtain a polymer (1-3).

For the purified polymer (1-3), the number-average molecular weight (Mn) was 10,000 and the average number (Fn(OH)) of terminal hydroxyl groups was 3.7 (mole/polymer 1 mole).

COMPARATIVE EXAMPLE 1-1

Into a flask equipped with a stirrer, nitrogen-introducing tube, thermometer and reflux condenser was charged 140 parts of ethylene glycol. An inside atmosphere of the flask was replaced by nitrogen, and then the temperature was raised up to 140° C. while introducing a nitrogen gas slowly. After the inside temperature of the reaction vessel became stable, a mixed liquid made by dissolving 2.0 parts of cyclohexanone peroxide in 40 parts of butyl acrylate and 60 parts of methyl methacrylate was added dropwise during 1 hour, and then stirring was continued at 140° C. for 10 minutes to complete a polymerization reaction. Sequentially, the purification process similar to EXAMPLE 1-1 was performed to obtain a purified comparative polymer (1—1).

For the purified comparative polymer (1—1), the number-average molecular weight (Mn) was 18,000 and the average number (Fn(OH)) of terminal hydroxyl groups was 0.5 (mole/polymer 1 mole).

EXAMPLE 1-4

Into a flask equipped with a stirrer, nitrogen-introducing tube, thermometer and reflux condenser was charged 320 parts (which was the amount of the alcohol (b) initially charged into the flask) of ethylene glycol. An inside atmosphere of the flask was replaced by nitrogen, and then the temperature was raised up to 140° C. while introducing a nitrogen gas slowly. After the inside temperature of the reaction vessel became stable, a first mixed liquid made by dissolving 4.4 parts of cyclohexanone peroxide in 67 parts of butyl acrylate, 45 parts of methyl methacrylate and 3 parts of acrylic acid and a second mixed liquid made by dissolving 3.4 parts of dodecylbenzenesulfonic acid (hereinafter, referred to as DBS) in 70 parts (which was the dropping amount of the alcohol (b)) of ethylene glycol were added dropwise during 2 hours simultaneously, and then stirring was continued at 140° C. for 30 minutes to complete a polymerization reaction. The polymerization conversion was 98%.

Sequentially, the purification was performed in a manner similar to EXAMPLE 1-1 to obtain a polymer (1-4).

For the purified polymer (1-4), the number-average molecular weight (Mn) was 3,200 and the average number (Fn(OH)) of terminal hydroxyl groups was 4.0 (mole/polymer 1 mole).

EXAMPLE 1-5 TO 1-17

The procedure of EXAMPLE 1-4 was repeated except that the kind and amount of the vinyl-based monomer (a), alcohol (b) (the initially charged portion and dropped portion), initiator (c) and catalyst (d) as well as the polymerization temperature were defined as shown in TABLES 1-1 to 1-4, whereby purified polymers (1-5) to (1-17) were obtained.

Properties of these polymers were shown in TABLE 1-6.

EXAMPLE 1-18

The procedure of EXAMPLE 1-4 was repeated except that the kind and amount of the vinyl-based monomer (a), alcohol (b) (the initially charged portion and dropped portion), initiator (c) and catalyst (d) as well as the polymerization temperature were defined as shown in TABLE 1-5, and that among the initiators (c), 0.3 parts of manganese naphthenate (a solution having a Mn content of 6% in butyl acrylate) was dissolved in the vinyl-based monomer (a) and added dropwise as a component of the first mixed liquid, and 2.0 parts of cyclohexanone peroxide was dissolved together with DBS in 40 parts of ethylene glycol (dropped portion) and added dropwise as a component of the second mixed liquid. Thereby a purified polymer (1-18) was obtained.

Properties of this polymer (1-18) were shown in TABLE 1-6.

EXAMPLE 1-19

The procedure of EXAMPLE 1-4 was repeated except that the kind and amount of the vinyl-based monomer (a), alcohol (b) (the initially charged portion and dropped portion), initiator (c) and catalyst (d) as well as the polymerization temperature were defined as shown in TABLE 1-5, and that 3.0 parts of SPAN 60 (a nonionic surfactant, made by Kao Co., Ltd.) was initially charged into the flask. Thereby a purified polymer (1-19) was obtained.

Properties of these polymers were shown in TABLE 1-6.

COMPARATIVE EXAMPLE 1-2

The procedure of COMPARATIVE EXAMPLE 1-1 was repeated to perform a polymerization reaction except that in addition to the mixed liquid comprising butyl acrylate, methyl methacrylate and cyclohexanone peroxide, a mixed liquid made by dissolving 0.6 parts of triethylamine in 33 parts of ethylene glycol was added dropwise into the reaction vessel during 1 hour at the same time as adding the former mixed liquid. Thereby a reaction mixture containing a polymer was obtained. The polymerization conversion of this reaction mixture was so low as 62%.

The purifying treatment similar to EXAMPLE 1-1 was performed for the above reaction mixture to obtain a purified comparative polymer (1-2). For the purified comparative polymer (1-2), the number-average molecular weight (Mn) was 6,000 and the average number (FnOH)) of terminal hydroxyl groups was 0.7 (mole/polymer 1 mole).

COMPARATIVE EXAMPLE 1-3

The procedure of COMPARATIVE EXAMPLE 1-1 was repeated to perform a polymerization reaction except that in addition to the mixed liquid comprising butyl acrylate, methyl methacrylate and cyclohexanone peroxide, a mixed liquid made by dissolving 0.5 parts of pyridine in 33 parts of ethylene glycol was added dropwise into the reaction vessel during 1 hour at the same time as adding the former mixed liquid. Thereby a reaction mixture containing a polymer was obtained. The polymerization conversion of this reaction mixture was so low as 74%.

The purifying treatment similar to EXAMPLE 1-1 was performed for the above reaction mixture to obtain a purified comparative polymer (1-3). For the purified comparative polymer (1-3), the number-average molecular weight (Mn) was 5,800 and the average number (Fn(OH)) of terminal hydroxyl groups was 0.7 (mole/polymer 1 mole).

COMPARATIVE EXAMPLE 1-4

The procedure of COMPARATIVE EXAMPLE 1-1 was repeated except that 3.0 parts of SPAN-60 (a nonionic surfactant, made by Kao Co., Ltd.) was initially charged into the flask together with 140 parts of ethylene glycol. Thereby a purified comparative polymer (1-4) was obtained.

For this comparative polymer (1-4), the number-average molecular weight (Mn) was 11,000 and the average number (Fn(OH)) of terminal hydroxyl groups was 0.6 (mole/polymer 1 mole).

COMPARATIVE EXAMPLE 1-5

The polymerization procedure of EXAMPLE 1-1 was repeated except that 100 parts of dioxane was initially charged into the flask together with 140 parts of ethylene glycol. Thereby a comparative polymer (1-5) was obtained.

For this comparative polymer (1-5) after purified, the number-average molecular weight (Mn) was 6,000 and the average number (Fn(OH)) of terminal hydroxyl groups was 2.1 (mole/polymer 1 mole).

COMPARATIVE EXAMPLE 1-6

The polymerization procedure of EXAMPLE 1-1 was repeated except that 50 parts of toluene was initially charged into the flask together with 140 parts of ethylene glycol. Thereby a comparative polymer (1-6) was obtained.

For this comparative polymer (1-6) after purified, the number-average molecular weight (Mn) was 5,800 and the average number (Fn(OH)) of terminal hydroxyl groups was 1.8 (mole/polymer 1 mole).

COMPARATIVE EXAMPLE 1-7

The polymerization procedure of EXAMPLE 1-1 was repeated except that 60 parts of SPAN 60 (a nonionic surfactant, made by Kao Co., Ltd.) was initially charged into the flask together with 140 parts of ethylene glycol. Thereby a comparative polymer (1-7) was obtained.

For this comparative polymer (1-7) after purified, the number-average molecular weight (Mn) was 5,500 and the average number (Fn(OH)) of terminal hydroxyl groups was 2.0 (mole/polymer 1 mole).

EXAMPLE 1-20

Into a flask equipped with a stirrer, nitrogen-introducing tube, thermometer and reflux condenser was charged 950 parts of ethylene glycol. An inside atmosphere of the flask was replaced by nitrogen, and then the temperature was raised up to 140° C. while introducing a nitrogen gas slowly, and a mixture of 2 parts of p-toluenesulfonic acid with 50 parts of ethylene glycol was added. Then, after the inside temperature of the reaction vessel became stable at 140° C., a mixed solution comprising 700 parts of butyl acrylate and 11 parts of cyclohexanone peroxide was added dropwise during 2 hours. After completion of adding, cooling was initiated, and at the stage when the inside temperature of the reaction vessel had fallen to 110° C., 2 parts of sodium hydrogen carbonate was added and stirring was continued for 30 minutes to complete a polymerization reaction. The polymerization conversion was 94%.

Sequentially, the resulting reaction mixture was allowed to stand, so that it separated into two layers consisting of a polymer layer (upper layer) and an ethylene glycol layer (lower layer). The polymer layer (upper layer) was isolated by a separatory funnel, and low boiling point components such as ethylene glycol, butyl acrylate and the like were removed from the polymer layer by distillation using a thin membrane evaporator under conditions of 150° C. and 10 Torr to obtain a purified polymer (1-20).

For the purified polymer (1-20), the number-average molecular weight (Mn) was 5,700, and furthermore, the average number (Fn(OH)) of terminal hydroxyl groups was 5.0 (mole/polymer 1 mole) and this value was such as corrected by analyzing an ethylene glycol portion remaining in an amount of 0.24 wt. % in the polymer (1-20) by a gas chromatography.

EXAMPLES 1-21 TO 1-23

The procedure of EXAMPLE 1-20 was repeated except that the polymerization temperature, dropping time and kind of alcohol (b) were defined as shown in TABLE 1-7, whereby polymerized and purified polymers (1-21) to (1-23) were obtained.

Properties of these polymers were shown in TABLE 1-9.

EXAMPLE 1-24

Into a flask equipped with a stirrer, nitrogen-introducing tube, thermometer and reflux condenser were charged 1,000 parts of ethylene glycol and 1.5 parts of p-toluenesulfonic acid. An inside atmosphere of the flask was replaced by nitrogen, and then the temperature was raised up to 140° C. while introducing a nitrogen gas slowly. Then, after the inside temperature of the reaction vessel became stable at 140° C., a mixed solution comprising 700 parts of butyl acrylate and 5.5 parts of cyclohexanone peroxide was added dropwise during 2 hours. After completion of adding, stirring was continued at 140° C. for 1 hour, and then cooling was initiated. At the stage when the inside temperature of the reaction vessel had fallen to 110° C., 1.5 parts of sodium hydrogen carbonate was added and stirring was continued for 30 minutes to complete a polymerization reaction. The polymerization conversion was 98%.

The resulting polymer was purified in a manner similar to EXAMPLE 1-20. For the purified polymer (1-24), the number-average molecular weight (Mn) was 7,800, and furthermore, the average number (Fn(OH)) of terminal hydroxyl groups was 6.0 (mole/polymer 1 mole) and this value was such as corrected by analyzing an ethylene glycol portion remaining in the polymer (1-24) by a gas chromatography.

EXAMPLES 1-25 TO 1-27

Into a flask equipped with a stirrer, nitrogen-introducing tube, thermometer and reflux condenser was charged 160 parts of ethylene glycol. An inside atmosphere of the flask was replaced by nitrogen, and then the temperature was raised up to 140° C. while introducing a nitrogen gas slowly. Then, after the inside temperature of the reaction vessel became stable at 140° C., for each EXAMPLE, a mixed liquid made by dissolving cyclohexanone peroxide in amount shown in TABLE 1-8 into the vinyl-based monomer (a) shown in TABLE 1-8 and another mixed liquid comprising 2 parts of dodecylbenzenesulfonic acid and 40 parts of ethylene glycol were added dropwise during 1 hour simultaneously, and then stirring was continued at 140° C. for 10 minutes to complete a polymerization reaction. Each polymerization conversion was shown in TABLE 1-9.

Sequentially, the resulting polymerization liquid was neutralized by toluene and an aqueous saturated solution of sodium hydrogen carbonate, and then an extracting solvent comprising toluene and water was used and a polymer was separated by extracting it from a reaction mixture containing the polymer, whereby a toluene solution containing the polymer was obtained. Toluene was removed by evaporating it, and furthermore, the residue was dried at 45° C. under a reduced pressure to obtain purified polymers (1-25) to (1-27). For the purified polymers (1-25) to (1-27), the number-average molecular weight (Mn) and average number (Fn(OH)) of terminal hydroxyl groups were shown in TABLE 1-9.

EXAMPLE 1-28

The procedure of EXAMPLE 1-24 was repeated except that the kind of vinyl-based monomer (a) and the amount of alcohol (b), p-toluenesulfonic acid, cyclohexanone peroxide and sodium hydrogen carbonate were defined as shown in TABLE 1-8, and that at the time of charging, water was added so that the water concentration may be 5.7 wt. %. Thereby a purified polymer (1-28) was obtained. For this polymer, the number-average molecular weight (Mn) and average number (Fn(OH)) of terminal hydroxyl groups were shown in TABLE 1-9.

EXAMPLE 1-29

Into a flask equipped with a stirrer, nitrogen-introducing tube, thermometer and reflux condenser were charged 139 parts of 1,2-propylene glycol and 0.78 parts of p-toluenesulfonic acid. An inside atmosphere of the flask was replaced by nitrogen, and then the temperature was raised up to 140° C. while introducing a nitrogen gas slowly. After the inside temperature became stable at 140°±3° C., a mixture of 100 parts of butyl acrylate with 1.56 parts of cyclohexanone peroxide was added dropwise during 1 hour while maintaining the inside temperature at 140° C. Maturing was performed at the same temperature for 10 minutes to complete a polymerization reaction. The polymerization conversion was 98%.

Sequentially, an extracting solvent comprising toluene and water was used and a polymer was separated by extracting it from a reaction mixture containing the polymer, whereby a toluene solution containing the polymer was obtained. This toluene solution was washed by 1) saturated brine, 2) an aqueous saturated solution of sodium hydrogen carbonate, and 3) saturated brine in this order, and it was dried by anhydrous sodium sulfate and filtrated spontaneously. Then the distillation-removal of toluene and condensation were performed by blowing a nitrogen gas into the toluene solution to obtain a toluene solution containing a purified polymer (1-29).

For the purified polymer (1-29), the number-average molecular weight (Mn) was 3,100, the average number (Fn(OH)) of terminal hydroxyl groups was 1.5 (mole/polymer 1 mole) and the gel portion percent A was 79%. Furthermore, the average number (Fn(OH) $_{NCO}$) of terminal functional groups based on an isocyanate group was 3.0 (mole/polymer 1 mole).

EXAMPLE 1-30 To 1-31

The polymerization reaction was performed in a manner similar to EXAMPLE 1-29 except that the amount of catalyst (d) was defined as shown in TABLE 1-10. Sequentially, the procedure of EXAMPLE 1-29 was repeated to obtain purified polymers (1-30) to (1-31).

For the purified polymers (1-30) to (1-31), the number-average molecular weight (Mn), average number (Fn(OH)) of terminal hydroxyl groups and gel portion percent A (%) were determined, and results obtained were shown in TABLE 1-13 together with the polymerization conversion.

EXAMPLE 1-32

Into a flask equipped with a stirrer, nitrogen-introducing tube, thermometer and reflux condenser were charged 139 parts of 1,2-propylene glycol and 0.78 parts of p-toluenesulfonic acid. An inside atmosphere of the flask was replaced by nitrogen, and then the temperature was raised up to 140° C. while introducing a nitrogen gas slowly. After the inside temperature became stable at 140°±3° C., a mixture of 100 parts of butyl acrylate with 3.12 parts of cyclohexanone peroxide was added dropwise during 1 hour while maintaining the inside temperature at 140° C. Maturing was performed at the same temperature for 10 minutes to complete a polymerization reaction. The polymerization conversion was 98%.

Sequentially, an extracting solvent comprising toluene and water was used and a polymer was separated by extracting it from a reaction mixture containing the polymer, whereby a toluene solution containing the polymer was obtained. This toluene solution was washed by 1) saturated brine, 2) an aqueous saturated solution of sodium hydrogen carbonate, and 3) saturated brine in this order, and it was dried by anhydrous sodium sulfate and filtrated spontaneously. Then the distillation-removal of toluene and condensation were performed by blowing a nitrogen gas into the toluene solution to obtain a toluene solution containing a purified polymer (1-32).

For the purified polymer (1-32), the number-average molecular weight (Mn) was 2,300, the average number (Fn(OH)) of terminal hydroxyl groups was 1.4 (mole/polymer 1 mole) and the gel portion percent A was 75%. Furthermore, the average number (Fn(OH) $s_{NCO}$) of terminal functional groups based on an isocyanate group was 2.9 (mole/polymer 1 mole).

EXAMPLES 1-33

The polymerization reaction was performed in manner similar to EXAMPLE 1-32 except that the amount of catalyst (d) was defined as shown in TABLE 1-11. Sequentially, the procedure of EXAMPLE 1-32 was repeated to obtain a purified polymer (1-33).

For the purified polymer (1-33), the number-average molecular weight (Mn), average number (Fn(OH)) of terminal hydroxyl groups and gel portion percent A (%) were determined, and results obtained were shown in TABLE 1-13 together with the polymerization conversion.

EXAMPLES 1-34

The polymerization reaction was performed in a manner similar to EXAMPLE 1-32 except that the amount of cyclohexanone peroxide used as the initiator (c) was defined as shown in TABLE 1-11. Sequentially, the procedure of EXAMPLE 1-32 was repeated to obtain a purified polymer (1-34).

For the purified polymer (1-34), the number-average molecular weight (Mn), average number (Fn(OH)) of terminal hydroxyl groups and gel portion percent A (%) were determined, and results obtained were shown in TABLE 1-13 together with the polymerization conversion.

EXAMPLES 1-35

The polymerization reaction was performed in a manner similar to EXAMPLE 1-32 except that the amount of 1,2-propylene glycol used as the alcohol (b) was defined as shown in TABLE 1-11. Sequentially, the procedure of EXAMPLE 1-32 was repeated to obtain a purified polymer (1-35).

For the purified polymer (1-35), the number-average molecular weight (Mn), average number (Fn(OH)) of terminal hydroxyl groups and gel portion percent A (%) were determined, and results obtained were shown in TABLE 1-13 together with the polymerization conversion.

EXAMPLE 1-36

Into a flask equipped with a stirrer, nitrogen-introducing tube, thermometer and reflux condenser were charged 139 parts of 1,2-propylene glycol and 0.78 parts of p-toluenesulfonic acid. An inside atmosphere of the flask was replaced by nitrogen, and then the temperature was raised up to 140° C. while introducing a nitrogen gas slowly. After the inside temperature became stable at 140°±3° C., a mixture comprising 90.3 parts of butyl acrylate, 9.7 parts of hyroxyethyl acrylate and 3.12 parts of cyclohexanone peroxide was added dropwise during 2 hours while maintaining the inside temperature at 140° C. Maturing was performed at the same temperature for 1 hour to complete a polymerization reaction. The polymerization conversion was 97%.

Sequentially, after completion of the maturing, the oil bath was released to allow the flask to cool by thermal radiation, and when the inside temperature had fallen to 80° C., 2.72 parts of sodium hydrogen carbonate was added to the resulting polymerization mixture to perform stirring for 30 minutes. Furthermore, the polymerization mixture was allowed to stand under a reduced pressure of 5 mmHg or lower at 140° C. for about 2 hours, whereby 1,2-propylene glycol was removed by devolatilization to obtain a purified polymer (1-36).

For the purified polymer (1-36), the number-average molecular weight (Mn) was 2,000, the average number (Fn(OH)) of terminal hydroxyl groups was 4.1 (mole/-polymer 1 mole) and the gel portion percent A was 92 2. Furthermore, the average number (Fn(OH) $_{NCO}$) of terminal functional groups based on an isocyanate group was 6.3 (mole/polymer 1 mole).

EXAMPLES 1-37

The polymerization reaction was performed in a manner similar to EXAMPLE 1-36 except that the amount of p-toluenesulfonic acid used as the catalyst (d) was defined as shown in TABLE 1-12. Sequentially, the procedure of EXAMPLE 1-36 was repeated to obtain a purified polymer (1-37).

For the purified polymer (1-37), the number-average molecular weight (Mn), average number (Fn(OH)) of terminal hydroxyl groups and gel portion percent A (%) were determined, and results obtained were shown in TABLE 1-13 together with the polymerization conversion. Furthermore, the average number (Fn(OH) $_{NCO}$) of terminal functional groups based on an isocyanate group was 8.6 (mole/polymer 1 mole).

COMPARATIVE EXAMPLE 1-8

Into flask equipped with a stirrer, nitrogen-introducing tube, thermometer and reflux condenser was charged 139 parts of 1,2-propylene glycol. An inside atmosphere of the flask was replaced by nitrogen, and then the temperature was raised up to 140° C. while introducing a nitrogen gas slowly. After the inside temperature became stable at 140°±3° C., a mixture of 100 parts of butyl acrylate with 1.56 parts of cyclohexanone peroxide was added dropwise during 1 hour while maintaining the inside temperature at 140° C. Maturing was performed at the same temperature for 10 minutes to complete a polymerization reaction. The polymerization conversion was 97%.

Sequentially, an extracting solvent comprising toluene and water was used and a polymer was separated by extracting it from a reaction mixture containing the polymer, whereby a toluene solution containing the polymer was obtained. This toluene solution was washed by 1) saturated brine, 2) an aqueous saturated solution of sodium hydrogen carbonate, and 3) saturated brine in this order, and it was dried by anhydrous sodium sulfate and filtrated spontaneously. Then the distillation-removal of toluene and condensation were performed by blowing a nitrogen gas into the toluene solution to obtain a toluene solution containing a purified comparative polymer (1-8).

For the purified comparative polymer (1-8), the number-average molecular weight (Mn) was 3,400, the average number (Fn(OH)) of terminal hydroxyl groups was 0.6 (mole/polymer 1 mole) and the gel portion percent A was 4%.

COMPARATIVE EXAMPLE 1-9

Into a flask equipped with a stirrer, nitrogen-introducing tube, thermometer and reflux condenser were charged 14 parts of 1,2-propylene glycol, 125 parts of xylene and 0.78 parts of p-toluenesulfonic acid. An inside atmosphere of the flask was replaced by nitrogen, and then the temperature was raised up to 140° C. while introducing a nitrogen gas slowly. After the inside temperature became stable at 140°±3° C., a mixture of 100 parts of butyl acrylate with 1.56 parts of cyclohexanone peroxide was added dropwise during 1 hour while maintaining the inside temperature at 140° C. Maturing was performed at the same temperature for 10 minutes to complete a polymerization reaction. The polymerization conversion was 94%.

Sequentially, an extracting solvent comprising toluene and water was used and a polymer was separated by extracting it from a reaction mixture containing the polymer, whereby a toluene solution containing the polymer was obtained. This toluene solution was washed by 1) saturated brine, 2) an aqueous saturated solution of sodium hydrogen carbonate, and 3) saturated brine in this order, and it was dried by anhydrous sodium sulfate and filtrated spontaneously. Then the distillation-removal of toluene and condensation were performed by blowing a nitrogen gas into the toluene solution to obtain a toluene solution containing a purified comparative polymer (1-9).

For the purified comparative polymer (1-9), the number-average molecular weight (Mn) was 5,400, the average number (Fn(OH)) of terminal hydroxyl groups was 0.7 (mole/polymer 1 mole) and the gel portion percent A was 8%.

TABLE 1-1

| EXAMPLE | Vinyl-based monomer (a) Kind | Vinyl-based monomer (a) Amount (parts) | Alcohol (b) Kind | Alcohol (b) Amount* (parts) | Initiator (c) Kind | Initiator (c) Amount (parts) | Catalyst (d) Kind | Catalyst (d) Amount (parts) | Surfactant (x) Kind | Surfactant (x) Amount (parts) | Polymerization temperature (°C.) |
|---|---|---|---|---|---|---|---|---|---|---|---|
| 1-4 | Butyl acrylate | 67 | Ethylene glycol | 320 (70) | Cyclohexanone peroxide | 4.4 | Dodecylbenzenesulfonic acid | 3.4 | — | — | 140 |
| | Methyl methacrylate | 45 | | | | | | | | | |
| | Acrylic acid | 3 | | | | | | | | | |
| 1-5 | Butyl acrylate | 45 | Ethylene glycol | 100 (20) | Benzoyl peroxide | 3.6 | Methanesulfonic | 0.6 | — | — | 110 |

TABLE 1-1-continued

| EXAMPLE | Vinyl-based monomer (a) Kind | Amount (parts) | Alcohol (b) Kind | Amount* (parts) | Initiator (c) Kind | Amount (parts) | Catalyst (d) Kind | Amount (parts) | Surfactant (x) Kind | Amount (parts) | Polymerization temperature (°C.) |
|---|---|---|---|---|---|---|---|---|---|---|---|
|  | Acrylonitrile | 35 | Ethanol | 30 (10) |  |  | acid |  |  |  |  |
|  | Methyl methacrylate | 17 |  |  |  |  |  |  |  |  |  |
|  | Acrylic acid | 3 |  |  |  |  |  |  |  |  |  |
| 1-6 | 2-Ethylhexyl acrylate | 63 | Ethylene glycol | 100 (20) | Benzoyl peroxide | 0.4 | Methanesulfonic acid | 0.6 | — | — | 100 |
|  | Butyl acrylate | 63 | Ethanol | 60 (20) |  |  |  |  |  |  |  |
|  | Vinyl acetate | 8 |  |  |  |  |  |  |  |  |  |
|  | Acrylic acid | 3 |  |  |  |  |  |  |  |  |  |

*: Numeral values without parentheses denote the amount of a portion initially charged into the flask, and numeral values in parentheses denote the amount of a dropped portion.

TABLE 1-2

| EXAMPLE | Vinyl-based monomer (a) Kind | Amount (parts) | Alcohol (b) Kind | Amount* (parts) | Initiator (c) Kind | Amount (parts) | Catalyst (d) Kind | Amount (parts) | Surfactant (x) Kind | Amount (parts) | Polymerization temperature (°C.) |
|---|---|---|---|---|---|---|---|---|---|---|---|
| 1-7 | 2-Ethylhexyl acrylate | 63 | Ethylene glycol monoacetate | 308 (77) | Benzoyl peroxide | 3.6 | Methanesulfonic acid | 1.2 | — | — | 110 |
|  | Butyl acrylate | 63 |  |  |  |  |  |  |  |  |  |
|  | Vinyl acetate | 8 |  |  |  |  |  |  |  |  |  |
|  | Acrylic acid | 3 |  |  |  |  |  |  |  |  |  |
| 1-8 | Ethyl acrylate | 100 | Ethylene glycol monoacetate | 308 (77) | Tertiary-butylperoxy pivalate | 3.5 | p-Toluenesulfonic acid | 0.6 | — | — | 80 |
| 1-9 | Butyl acrylate | 128 | Ethylene glycol | 320 (70) | Tertiary-butylperoxy pivalate | 7.0 | p-Toluenesulfonic acid | 2.0 | — | — | 90 |
|  |  |  | Trimethylolpropane | 60 |  |  |  |  |  |  |  |

*: Numeral values without parentheses denote the amount of a portion initially charged into the flask, and numeral values in parentheses denote the amount of a dropped portion.

TABLE 1-3

| EXAMPLE | Vinyl-based monomer (a) Kind | Amount (parts) | Alcohol (b) Kind | Amount* (parts) | Initiator (c) Kind | Amount (parts) | Catalyst (d) Kind | Amount (parts) | Surfactant (x) Kind | Amount (parts) | Polymerization temperature (°C.) |
|---|---|---|---|---|---|---|---|---|---|---|---|
| 1-10 | Methyl methacrylate | 100 | Trimethylolpropane | 200 | Diisopropylbenzene hydroperoxide | 4.0 | p-Toluenesulfonic acid | 2.0 | — | — | 140 |
|  |  |  | Glycerol | (50) |  |  |  |  |  |  |  |
| 1-11 | Methyl methacrylate | 90 | Trimethylolpropane | 200 | Diisopropylbenzene hydroperoxide | 2.0 | p-Toluenesulfonic acid | 2.0 | — | — | 140 |
|  | 2-Hydroxyethyl methacrylate | 10 | Glycerol | (50) |  |  |  |  |  |  |  |
| 1-12 | Butyl acrylate | 128 | Ethyl cellosolve | 250 (50) | Tertiary-butylperoxy pivalate | 7.0 | Benzenesulfonic acid | 2.0 | — | — | 90 |
| 1-13 | Methyl methacrylate | 100 | Ethylene glycol mono- | 258 (50) | Tertiary-butylperoxy | 7.0 | Benzenesulfonic acid | 2.0 | — | — | 90 |

TABLE 1-3-continued

| EXAMPLE | Vinyl-based monomer (a) | | Alcohol (b) | | Initiator (c) | | Catalyst (d) | | Surfactant (x) | | Polymerization temperature (°C.) |
|---|---|---|---|---|---|---|---|---|---|---|---|
| | Kind | Amount (parts) | Kind | Amount* (parts) | Kind | Amount (parts) | Kind | Amount (parts) | Kind | Amount (parts) | |
| | | | acetate | | pivalate | | | | | | |

*: Numeral values without parentheses denote the amount of a portion initially charged into the flask, and numeral values in parentheses denote the amount of a dropped portion.

TABLE 1-4

| EXAMPLE | Vinyl-based monomer (a) | | Alcohol (b) | | Initiator (c) | | Catalyst (d) | | Surfactant (x) | | Polymerization temperature (°C.) |
|---|---|---|---|---|---|---|---|---|---|---|---|
| | Kind | Amount (parts) | Kind | Amount* (parts) | Kind | Amount (parts) | Kind | Amount (parts) | Kind | Amount (parts) | |
| 1-14 | Methyl methacrylate | 60 | Ethylene glycol monoacetate | 258 (50) | Benzoyl peroxide | 3.6 | Benzene sulfonic acid | 8.0 | — | — | 100 |
| | Butyl acrylate | 45 | | | | | | | | | |
| | Acrylic acid | 3 | | | | | | | | | |
| 1-15 | Methyl acrylate | 86 | Ethylene glycol | 100 (20) | Cyclohexanone peroxide | 2.0 | p-Toluenesulfonic acid | 2.0 | — | — | 140 |
| | | | n-Butanol | 60 (20) | | | Methanesulfonic acid | 1.0 | | | |
| 1-16 | Methyl methacrylate | 90 | Ethylene glycol | 160 (40) | Cyclohexanone peroxide | 2.0 | Dodecylbenzenesulfonic acid | 2.0 | — | — | 140 |
| | γ-Methacryloyloxytrimethoxysilane | 10 | | | | | | | | | |
| 1-17 | Butyl acrylate | 110 | Ethylene glycol | 160 (40) | Lauroyl peroxide | 4.0 | Dodecylbenzenesulfonic acid | 2.0 | — | — | 80 |
| | Acrylonitrile | 15 | Pentaerythritol | 20 | | | | | | | |

*: Numeral values without parentheses denote the amount of a portion initially charged into the flask, and numeral values in parentheses denote the amount of a dropped portion.

TABLE 1-5

| EXAMPLE | Vinyl-based monomer (a) | | Alcohol (b) | | Initiator (c) | | Catalyst (d) | | Surfactant (x) | | Polymerization temperature (°C.) |
|---|---|---|---|---|---|---|---|---|---|---|---|
| | Kind | Amount (parts) | Kind | Amount* (parts) | Kind | Amount (parts) | Kind | Amount (parts) | Kind | Amount (parts) | |
| 1-18 | Butyl acrylate | 110 | Ethylene glycol | 160 (40) | Cyclohexanone peroxide | 2.0 | Dodecylbenzenesulfonic acid | 2.0 | — | — | 40 |
| | Styrene | 20 | Pentaerythritol | 20 | Manganese naphthenate | 0.3 | | | | | |
| 1-19 | Styrene | 104 | Ethylene glycol monoacetate | 258 (50) | Lauroyl peroxide | 2.0 | Dodecylbenzenesulfonic acid | 2.0 | SPAN-60 | 3.0 | 80 |

*: Numeral values without parentheses denote the amount of a portion initially charged into the flask, and numeral values in parentheses denote the amount of a dropped portion.

TABLE 1-6

| Polymer | Polymerization conversion (%) | Number-average molecular weight | Mw/Mn | Fn (OH) | Gel portion percent (%) | |
|---|---|---|---|---|---|---|
| | | | | | A | B |
| (1-4) | 98 | 3200 | 2.1 | 4.0 | 100 | 98 |
| (1-5) | 98 | 13000 | 2.5 | 3.4 | 96 | 93 |
| (1-6) | 96 | 77000 | 2.6 | 3.0 | 95 | 90 |
| (1-7) | 95 | 3600 | 1.9 | 1.9 | 92 | 4 |
| (1-8) | 95 | 4000 | 2.0 | 2.0 | 95 | 5 |
| (1-9) | 97 | 2500 | 2.2 | 4.8 | 100 | 96 |
| (1-10) | 94 | 6700 | 2.2 | 5.5 | 100 | 99 |
| (1-11) | 95 | 11000 | 2.3 | 13.0 | 99 | 98 |
| (1-12) | 96 | 3800 | 2.1 | 2.0 | 95 | 5 |
| (1-13) | 96 | 4500 | 2.0 | 2.0 | 96 | 6 |
| (1-14) | 95 | 5200 | 1.9 | 1.9 | 93 | 5 |
| (1-15) | 98 | 6300 | 2.5 | 3.3 | 95 | 90 |
| (1-16) | 95 | 4900 | 2.2 | 4.0 | 98 | 93 |
| (1-17) | 93 | 3900 | 2.0 | 4.4 | 99 | 96 |

TABLE 1-6-continued

| Polymer | Polymerization conversion (%) | Number-average molecular weight | Mw/Mn | Fn (OH) | Gel portion percent (%) A | B |
|---|---|---|---|---|---|---|
| (1-18) | 93 | 2200 | 2.0 | 4.6 | 100 | 95 |
| (1-19) | 95 | 8000 | 2.2 | 1.9 | 95 | 4 |

TABLE 1-9

| Polymer | Polymerization conversion (%) | Number-average molecular weight | Fn(OH) |
|---|---|---|---|
| (1-20) | 94 | 5700 | 5.0 |
| (1-21) | 97 | 11000 | 4.3 |
| (1-22) | 96 | 5300 | 3.7 |
| (1-23) | 98 | 5600 | 5.9 |
| (1-24) | 98 | 7800 | 6.0 |
| (1-25) | 96 | 4100 | 5.0 |
| (1-26) | 95 | 4000 | 5.9 |
| (1-27) | 97 | 6200 | 3.9 |
| (1-28) | 95 | 7000 | 6.5 |

TABLE 1-7

| EXAMPLE | Vinyl-based monomer (a) Kind | Amount (parts) | Alcohol (b) Kind | Amount (parts) | Initiator (c) Kind | Amount (parts) | Catalyst (d) Kind | Amount (parts) | Sodium hydrogen carbonate Amount (parts) | Dropping time hours | Polymerization temperature (°C.) |
|---|---|---|---|---|---|---|---|---|---|---|---|
| 1-20 | Butyl acrylate | 700 | Ethylene glycol | 1000 | Cyclohexanone peroxide | 1.1 | p-Toluene sulfonic acid | 2.0 | 2 | 2 | 140 |
| 1-21 | Butyl acrylate | 700 | Ethylene glycol | 1000 | Cyclohexanone peroxide | 1.1 | p-Toluene sulfonic acid | 2.0 | 2 | 2 | 130 |
| 1-22 | Butyl acrylate | 141 | Ethylene glycol 1,2-Propylene glycol | 19.6 176.7 | Cyclohexanone peroxide | 2.4 | p-Toluene sulfonic acid | 4.4 | 4.4 | 1 | 140 |
| 1-23 | Butyl acrylate | 141 | Ethylene glycol 1,2-Propylene glycol | 98.2 98.2 | Cyclohexanone peroxide | 2.4 | p-Toluene sulfonic acid | 4.4 | 4.4 | 2 | 140 |
| 1-24 | Butyl acrylate | 700 | Ethylene glycol | 1000 | Cyclohexanone peroxide | 3.0 | p-Toluene sulfonic acid | 1.5 | 1.5 | 2 | 140 |

TABLE 1-8

| EXAMPLE | Vinyl-based monomer (a) Kind | Amount (parts) | Alcohol (b) Kind | Amount (parts) | Initiator (c) Kind | Amount (parts) | Catalyst (d) Kind | Amount (parts) | Sodium hydrogen carbonate Amount (parts) | Dropping time hours | Polymerization temperature (°C.) |
|---|---|---|---|---|---|---|---|---|---|---|---|
| 1-25 | Ethyl acrylate Hydroxyethyl acrylate | 108 5 | Ethylene glycol | 200 | Cyclohexanone peroxide | 2.4 | Dodecylbenzene sulfonic acid | 2 | * | 1 | 140 |
| 1-26 | Ethyl acrylate Hydroxyethyl methacrylate | 108 6 | Ethylene glycol | 200 | Cyclohexanone peroxide | 2.4 | Dodecylbenzene sulfonic acid | 2 | * | 1 | 140 |
| 1-27 | Methyl acrylate Cyclohexyl methacrylate | 100 100 | Ethylene glycol | 200 | Cyclohexanone peroxide | 1.2 | Dodecylbenzene sulfonic acid | 2 | * | 1 | 140 |
| 1-28 | Ethyl acrylate Methyl methacrylate Acrylic acid | 159 124 58 | Ethylene glycol | 800 | Cyclohexanone peroxide | 9.9 | p-Toluene sulfonic acid | 4 | 4 | 2 | 140 |

*: Washing-neutralization by an aqueous saturated solution.

TABLE 1-10

| EX-AMPLE | Vinyl-based monomer (a) Kind | Amount (parts) | Alcohol (b) Kind | Amount* (parts) | Initiator (c) Kind | Amount (parts) | Catalyst (d) Kind | Amount (parts) |
|---|---|---|---|---|---|---|---|---|
| 1-29 | Butyl acrylate | 100 | 1,2-Propylene glycol | 139 | Cyclohexanone peroxide | 1.56 | p-Toluene sulfonic acid | 0.78 |
| 1-30 | Butyl acrylate | 100 | 1,2-Propylene glycol | 139 | Cyclohexanone peroxide | 1.56 | p-Toluene sulfonic acid | 1.56 |
| 1-31 | Butyl acrylate | 100 | 1,2-Propylene glycol | 139 | Cyclohexanone peroxide | 1.56 | p-Toluene sulfonic acid | 3.12 |

Polymerization method: The (b) and (d) were charged into the flask, the (a) and (c) were added dropwise at 140° C. during 1 hour, and then maturing was performed for 10 minutes.

TABLE 1-11

| EX-AMPLE | Vinyl-based monomer (a) Kind | Amount (parts) | Alcohol (b) Kind | Amount* (parts) | Initiator (c) Kind | Amount (parts) | Catalyst (d) Kind | Amount (parts) |
|---|---|---|---|---|---|---|---|---|
| 1-32 | Butyl acrylate | 100 | 1,2-Propylene glycol | 139 | Cyclohexanone peroxide | 3.12 | p-Toluene sulfonic acid | 0.78 |
| 1-33 | Butyl acrylate | 100 | 1,2-Propylene glycol | 139 | Cyclohexanone peroxide | 3.12 | p-Toluene sulfonic acid | 1.06 |
| 1-34 | Butyl acrylate | 100 | 1,2-Propylene glycol | 139 | Cyclohexanone peroxide | 0.78 | p-Toluene sulfonic acid | 0.78 |
| 1-35 | Butyl acrylate | 100 | 1,2-Propylene glycol | 13.9 | Cyclohexanone peroxide | 3.12 | p-Toluene sulfonic acid | 0.78 |

Polymerization method: The (b) and (d) were charged into the flask, the (a) and (c) were added dropwise at 140° C. during 1 hour, and then maturing was performed for 10 minutes.

TABLE 1-12

| EX-AMPLE | Vinyl-based monomer (a) Kind | Amount (parts) | Alcohol (b) Kind | Amount* (parts) | Initiator (c) Kind | Amount (parts) | Catalyst (d) Kind | Amount (parts) |
|---|---|---|---|---|---|---|---|---|
| 1-36 | Butyl acrylate | 90.3 | 1,2-Propylene glycol | 139 | Cyclohexanone peroxide | 3.12 | p-Toluene sulfonic acid | 0.78 |
|  | Hydroxyethyl acrylate | 9.7 |  |  |  |  |  |  |
| 1-37 | Butyl acrylate | 90.3 | 1,2-Propylene glycol | 139 | Cyclohexanone peroxide | 3.12 | p-Toluene sulfonic acid | 1.06 |
|  | Hydroxyethyl acrylate | 9.7 |  |  |  |  |  |  |

Polymerization method: The (b) and (d) were charged into the flask, the (a) and (c) were added dropwise at 140° C. during 2 hours, and then maturing was performed for 1 hour.

TABLE 1-13

| Polymer | Polymerization conversion (%) | Number-average molecular weight | Fn(OH) | Gel portion percent (%) A |
|---|---|---|---|---|
| (1-29) | 98 | 3100 | 1.5 | 79 |
| (1-30) | 97 | 2700 | 2.4 | 96 |
| (1-31) | 96 | 2600 | 3.2 | 96 |
| (1-32) | 98 | 2300 | 1.4 | 75 |
| (1-33) | 95 | 2300 | 2.4 | 94 |
| (1-34) | 94 | 3100 | 2.3 | 95 |
| (1-35) | 92 | 9400 | 2.3 | 95 |
| (1-36) | 90 | 2000 | 4.1 | 92 |
| (1-37) | 91 | 2600 | 6.0 | 100 |

EXAMPLE 2-1

Into a flask equipped with a stirrer, nitrogen-introducing tube, thermometer and reflux condenser was charged 140 parts of ethylene glycol. An inside atmosphere of the flask was replaced by nitrogen, and then the temperature was raised up to 140° C. while introducing a nitrogen gas slowly. After the inside temperature of the reaction vessel became stable, a mixed liquid made by dissolving 2.0 parts of cyclohexanone peroxide in 40 parts of butyl acrylate and 60 parts of methyl methacrylate and another mixed liquid comprising 0.53 parts of hydrochloric acid (35%) and 33 parts of ethylene glycol were added dropwise during 1 hour simultaneously, and then stirring was continued at 140° C. for 10 minutes to complete a polymerization reaction. The polymerization conversion was 85%.

Sequentially, an extracting solvent comprising toluene and water was used and a polymer was separated by extracting it from a reaction mixture containing the polymer, whereby a toluene solution containing the polymer was obtained. Toluene was removed by evaporating it, and furthermore, the residue was dried at 45° C. under a reduced pressure to obtain a purified polymer (2-1).

For the purified polymer (2-1), the number-average molecular weight (Mn) was 8,500 and the average number (Fn(OH)) of terminal hydroxyl groups was 3.5 (mole/polymer 1 mole).

EXAMPLE 2-2

Into a flask equipped with a stirrer, nitrogen-introducing tube, thermometer and reflux condenser was charged 140 parts of ethylene glycol. An inside atmosphere of the flask was replaced by nitrogen, and then the temperature was raised up to 140° C. while introducing a nitrogen gas slowly. After the inside temperature of the reaction vessel became stable, a mixed liquid made by dissolving 1.0 part of cyclohexanone peroxide and 0.8 parts of AIBN (azobis(isobutyronitrile)) in 40 parts of butyl acrylate and 60 parts of methyl methacrylate and another mixed liquid comprising 0.53 parts of hydrochloric acid (35%) and 33 parts of ethylene glycol were added dropwise during 1 hour simultaneously, and then stirring was continued at 140° C. for 10 minutes to complete a polymerization reaction. The polymerization conversion was 89%.

Sequentially, the purification was performed in a manner similar to EXAMPLE 2-1 to obtain a polymer (2-2).

For the purified polymer (2-2), the number-average molecular weight (Mn) was 11,000 and the average number (Fn(OH)) of terminal hydroxyl groups was 3.2 (mole/polymer 1 mole).

EXAMPLE 2-3

Into a flask equipped with a stirrer, nitrogen-introducing tube, thermometer and reflux condenser was charged 140 parts of ethylene glycol. An inside atmosphere of the flask was replaced by nitrogen, and then the temperature was raised up to 140° C. while introducing a nitrogen gas slowly. After the inside temperature of the reaction vessel became stable, a mixed liquid made by dissolving 1.0 part of cyclohexanone peroxide and 0.53 parts of hydrochloric acid (35%) in 40 parts of butyl acrylate and 60 parts of methyl methacrylate and another mixed liquid comprising 2.8 parts of a 60% aqueous hydrogen peroxide solution and 33 parts of ethylene glycol were added dropwise during 1 hour simultaneously, and then stirring was continued at 140° C. for 10 minutes to complete a polymerization reaction. The polymerization conversion was 88%.

Sequentially, the purification was performed in a manner similar to EXAMPLE 2-1 to obtain a polymer (2-3).

For the purified polymer (2-3), the number-average molecular weight (Mn) was 12,000 and the average number (Fn(OH)) of terminal hydroxyl groups was 3.2 (mole/polymer 1 mole).

EXAMPLE 2-4

Into a flask equipped with stirrer, nitrogen-introducing tube, thermometer and reflux condenser was charged 320 parts (which was the amount of the alcohol (b) initially charged into the flask) of ethylene glycol. An inside atmosphere of the flask was replaced by nitrogen, and then the temperature was raised up to 140° C. while introducing a nitrogen gas slowly. After the inside temperature of the reaction vessel became stable, a first mixed liquid made by dissolving 4.4 parts of cyclohexanone peroxide in 67 parts of butyl acrylate, 45 parts of methyl methacrylate and 3 parts of acrylic acid and a second mixed liquid made by dissolving 1.1 parts of hydrochloric acid (35%) in 70 parts (which was the dropping amount of the alcohol (b)) of ethylene glycol were added dropwise during 2 hours simultaneously, and then stirring was continued at 140° C. for 30 minutes to complete a polymerization reaction. The polymerization conversion was 93%.

Sequentially, the purification was performed in a manner similar to EXAMPLE 2-1 to obtain a polymer (2-4).

For the purified polymer (2-4), the number-average molecular weight (Mn) was 4,000 and the average number (Fn(OH)) of terminal hydroxyl groups was 3.5 (mole/polymer 1 mole).

EXAMPLES 2-5 TO 2-17

The procedure of EXAMPLE 2-4 was repeated except that the kind and amount of the vinyl-based monomer (a), alcohol (b) (the initially charged portion and dropped portion), initiator (c) and catalyst (d) as well as the polymerization temperature were defined as shown in TABLES 2-1 to 2-4, whereby purified polymers (2-5) to (2-17) were obtained.

Properties of these polymers were shown in TABLE 2-7.

EXAMPLE 2-18

The procedure of EXAMPLE 2-4 was repeated except that the kind and amount of the vinyl-based monomer (a), alcohol (b) (the initially charged portion and dropped portion), initiator (c) and catalyst (d) as well as the polymerization temperature were defined as shown in TABLE 2-5, and that among the initiators (c) , 0.3 parts of manganese naphthenate (a solution having a bin content of 6% in butyl acrylate) was dissolved in the vinyl-based monomer (a) and added dropwise as a component of the first mixed liquid, and 2.0 parts of cyclohexanone peroxide was dissolved together with the catalyst (d) in 40 parts of ethylene glycol (dropped portion) and added dropwise as a component of the second mixed liquid. Thereby a purified polymer (2-18) was obtained.

Properties of this polymer (2-18) were shown in TABLE 2-7.

EXAMPLES 2-19 TO 2-21

The procedure of EXAMPLE 2-4 was repeated except that the kind and amount of the vinyl-based monomer (a), alcohol (b) (the initially charged portion and dropped portion), initiator (c) and catalyst (d) as well as the polymerization temperature were defined as shown in TABLES 2-5 to 2-6, and that 3.0 parts of a surfactant (SPAN 60 (a nonionic surfactant, made by Kao Co., Ltd.) for EXAMPLES 2-19 and 2-20, and PELEX OT-P (made by Kao Co., Ltd.) for EXAMPLE 2-21) was initially charged into the flask. Thereby purified polymers (2-19) to (2-21) were obtained.

Properties of these polymers were shown in TABLE 2-7.

EXAMPLE 2-22

The procedure of EXAMPLE 2-4 was repeated except that the kind and amount of the vinyl-based monomer (a), alcohol (b) (the initially charged .portion and dropped portion), initiator (c) and catalyst (d) as well as the polymerization temperature were defined as shown in TABLE 2-6. Thereby a purified polymer (2-22) was obtained.

Properties of this polymer were shown in TABLE 2-7.

COMPARATIVE EXAMPLE 2-1

The polymerization procedure of EXAMPLE 2-1 was repeated except that 100 parts of dioxane was initially charged into the flask together with 140 parts of ethylene glycol. Thereby a comparative polymer (2-1) was obtained.

For this comparative polymer (2-1) after purified, the number-average molecular weight (Mn) was 6,000 and the average number (Fn(OH)) of terminal hydroxyl groups was 1.5 (mole/polymer 1 mole).

COMPARATIVE EXAMPLE 2-2

The polymerization procedure of EXAMPLE 2-1 was repeated except that 50 parts of toluene was initially charged into the flask together with 140 parts of ethylene glycol. Thereby a comparative polymer (2-2) was obtained.

For this comparative polymer (2-2) after purified, the number-average molecular weight (Mn) was 6,500 and the average number (Fn(OH)) of terminal hydroxyl groups was 1.3 (mole/polymer 1 mole).

COMPARATIVE EXAMPLE 2-3

The polymerization procedure of EXAMPLE 2-1 was repeated except that 60 parts of SPAN 60 (a nonionic surfactant, made by Kao Co., Ltd.) was initially charged into the flask together with 140 parts of ethylene glycol. Thereby a comparative polymer (2-3) was obtained.

For this comparative polymer (2-3) after purified, the number-average molecular weight (Mn) was 6,600 and the average number (Fn(OH)) of terminal hydroxyl groups was 1.5 (mole/polymer 1 mole).

EXAMPLE 2-23

Into a flask equipped with a stirrer, nitrogen-introducing tube, thermometer and reflux condenser was charged 140 parts of ethylene glycol. An inside atmosphere of the flask was replaced by nitrogen, and then the temperature was raised up to 140° C. while introducing a nitrogen gas slowly. After the inside temperature of the reaction vessel became stable, a mixed liquid made by dissolving 2.0 parts of cyclohexanone peroxide in 40 parts of butyl acrylate and 60 parts of methyl methacrylate and another mixed liquid comprising 0.5 parts of phosphoric acid and 33 parts of ethylene glycol were added dropwise during 1 hour simultaneously, and then stirring was continued at 140° C. for 10 minutes to complete a polymerization reaction. The polymerization conversion was 75%.

Sequentially, an extracting solvent comprising toluene and water was used and a polymer was separated by extracting it from a reaction mixture containing the polymer, whereby a toluene solution containing the polymer was obtained. Toluene was removed by evaporating it, and furthermore, the residue was dried at 45° C. under a reduced pressure to obtain a purified polymer (2-23).

For the purified polymer (2-23), the number-average molecular weight (Mn) was 7,000 and the average number (Fn(OH)) of terminal hydroxyl groups was 3.0 (mole/polymer 1 mole).

EXAMPLE 2-24

Into a flask equipped with a stirrer, nitrogen-introducing tube, thermometer and reflux condenser was charged 140 parts of ethylene glycol. An inside atmosphere of the flask was replaced by nitrogen, and then the temperature was raised up to 140° C. while introducing a nitrogen gas slowly. After the inside temperature of the reaction vessel became stable, a mixed liquid made by dissolving 1.0 part of cyclohexanone peroxide and 0.8 parts of AIBN (azobis(isobutyronitrile)) in 40 parts of butyl acrylate and 60 parts of methyl methacrylate and another mixed liquid comprising 0.5 parts of phosphoric acid and 33 parts of ethylene glycol were added dropwise during 1 hour simultaneously, and then stirring was continued at 140° C. for 10 minutes to complete a polymerization reaction. The polymerization conversion was 78%.

Sequentially, the purification was performed in a manner similar to EXAMPLE 2-23 to obtain a polymer (2-24).

For the purified polymer (2-24), the number-average molecular weight (Mn) was 8,000 and the average number (Fn(OH)) of terminal hydroxyl groups was 2.9 (mole/polymer 1 mole).

EXAMPLE 2-25

Into a flask equipped with a stirrer, nitrogen-introducing tube, thermometer and reflux condenser was charged 140 parts of ethylene glycol. An inside atmosphere of the flask was replaced by nitrogen, and then the temperature was raised up to 140° C. while introducing a nitrogen gas slowly. After the inside temperature of the reaction vessel became stable, a mixed liquid made by dissolving 1.0 part of cyclohexanone peroxide and 0.5 parts of phosphoric acid in 40 parts of butyl acrylate and 60 parts of methyl methacrylate and another mixed liquid comprising 2.8 parts of a 60% aqueous hydrogen peroxide solution and 33 parts of ethylene glycol were added dropwise during 1 hour simultaneously, and then stirring was continued at 140° C. for 10 minutes to complete a polymerization reaction. The polymerization conversion was 72%.

Sequentially, the purification was performed in a manner similar to EXAMPLE 2-23 to obtain a polymer (2-25).

For the purified polymer (2-25), the number-average molecular weight (Mn) was 9,200 and the average number (Fn(OH)) of terminal hydroxyl groups was 2.9 (mole/polymer 1 mole).

EXAMPLE 2-26

Into a flask equipped with a stirrer, nitrogen-introducing tube, thermometer and reflux condenser was charged 320 parts (which was the amount of the alcohol (b) initially charged into the flask) of ethylene glycol. An inside atmosphere of the flask was replaced by nitrogen, and then the temperature was raised up to 140° C. while introducing a nitrogen gas slowly. After the inside temperature of the reaction vessel became stable, a first mixed liquid made by dissolving 4.4 parts of cyclohexanone peroxide in 67 parts of butyl acrylate, 45 parts of methyl methacrylate and 3 parts of acrylic acid and a second mixed liquid made by dissolving 1.0 part of phosphoric acid in 70 parts (which was the-dropping amount of the alcohol (b)) of ethylene glycol were added dropwise during 2 hours simultaneously, and then stirring was continued at 140° C. for 30 minutes to complete a polymerization reaction. The polymerization conversion was 80%.

Sequentially, the purification was performed in a manner similar to EXAMPLE 2-23 to obtain a polymer (2-26).

For the purified polymer (2-26), the number-average molecular weight (Mn) was 2,900 and the average number (Fn(OH)) of terminal hydroxyl groups was 3.1 (mole/polymer 1 mole).

EXAMPLES 2-27 TO 2-38

The procedure of EXAMPLE 2-26 was repeated except that the kind and amount of the vinyl-based monomer (a), alcohol (b) (the initially charged portion and dropped portion), initiator (c) and catalyst (d) as well as the polymerization temperature were defined as shown in TABLES 2-8 to 2-11, whereby purified polymers (2-27) to (2-38) were obtained.

Properties of these polymers were shown in TABLE 2-13.

EXAMPLE 2-39

The procedure of EXAMPLE 2-26 was repeated except that the kind and amount of the vinyl-based monomer (a), alcohol (b) (the initially charged portion and dropped portion), initiator (c) and catalyst (d) as well as the polymerization temperature were defined as shown in TABLE 2-12, and that among the initiators (c), 0.3 parts of manganese naphthenate (a solution having a Ha content of 6% in butyl acrylate) was dissolved in the vinyl-based monomer (a) and added dropwise as a component of the first mixed liquid, and 2.0 parts of cyclohexanone peroxide was dissolved together with the catalyst (d) in 40 parts of ethylene glycol (dropped portion) and added dropwise as a component of the second mixed liquid. Thereby a purified polymer (2-39) was obtained.

Properties of this polymer (2-39) were shown in TABLE 2-13.

EXAMPLES 2-40 TO 2-41

The procedure of EXAMPLE 2-26 was repeated except that the kind and amount of the vinyl-based monomer (a), alcohol (b) (the initially charged portion and dropped portion), initiator (c) and catalyst (d) as well as the polymerization temperature were defined as shown in TABLE 2-12, and that 3.0 parts of a surfactant (SPAN 60 (a nonionic surfactant, made by Kao Co., Ltd.)) was initially charged into the flask. Thereby purified polymers (2-40) to (2-41) were obtained.

Properties of these polymers were shown in TABLE 2-13.

COMPARATIVE EXAMPLE 2-4

The polymerization procedure of EXAMPLE 2-23 was repeated except that 100 parts of dioxane was initially charged into the flask together with 140 parts of ethylene glycol. Thereby a comparative polymer (2-4) was obtained.

For this comparative polymer (2-4) after purified, the number-average molecular weight (Mn) was 6,200 and the average number (Fn(OH)) of terminal hydroxyl groups was 0.9 (mole/polymer 1 mole).

COMPARATIVE EXAMPLE 2-5

The polymerization procedure of EXAMPLE 2-23 was repeated except that 50 parts of toluene was initially charged into the flask together with 140 parts of ethylene glycol. Thereby a comparative polymer (2-5) was obtained.

For this comparative polymer (2-5) after purified, the number-average molecular weight (Mn) was 5,800 and the average number (Fn(OH)) of terminal hydroxyl groups was 1.8 (mole/polymer 1 mole).

COMPARATIVE EXAMPLE 2-6

The polymerization procedure of EXAMPLE 2-23 was repeated except that 60 parts of SPAN 60 (a nonionic surfactant, made by Kao Co., Ltd.) was initially charged into the flask together with 140 parts of ethylene glycol. Thereby a comparative polymer (2-6) was obtained.

For this comparative polymer (2-6) after purified, the number-average molecular weight (Mn) was 5,500 and the average number (Fn(OH)) of terminal hydroxyl groups was 2.0 (mole/polymer1 mole).

TABLE 2-1

| EXAMPLE | Vinyl-based monomer (a) Kind | Amount (parts) | Alcohol (b) Kind | Amount* (parts) | Initiator (c) Kind | Amount (parts) | Catalyst (d) Kind | Amount (parts) | Surfactant (x) Kind | Amount (parts) | Polymerization temperature (°C.) |
|---|---|---|---|---|---|---|---|---|---|---|---|
| 2-4 | Butyl acrylate | 67 | Ethylene glycol | 320 (70) | Cyclohexanone peroxide | 4.4 | Hydrochloric acid (35%) | 1.1 | — | — | 140 |
|  | Methyl methacrylate | 45 |  |  |  |  |  |  |  |  |  |
|  | Acrylic acid | 3 |  |  |  |  |  |  |  |  |  |
| 2-5 | Butyl acrylate | 45 | Ethylene glycol | 100 (20) | Benzoyl peroxide | 3.6 | Sulfuric acid | 0.5 | — | — | 110 |
|  | Acrylonitrile | 35 | Ethanol | 30 (10) |  |  |  |  |  |  |  |
|  | Methyl methacrylate | 17 |  |  |  |  |  |  |  |  |  |
|  | Acrylic acid | 3 |  |  |  |  |  |  |  |  |  |
| 2-6 | 2-Ethylhexyl acrylate | 63 | Ethylene glycol | 100 (20) | Benzoyl peroxide | 0.4 | Sulfuric acid | 0.5 | — | — | 100 |
|  | Butyl acrylate | 63 | Ethanol | 60 (20) |  |  |  |  |  |  |  |
|  | Vinyl acetate | 8 |  |  |  |  |  |  |  |  |  |

TABLE 2-1-continued

| EX-AMPLE | Vinyl-based monomer (a) Kind | Amount (parts) | Alcohol (b) Kind | Amount* (parts) | Initiator (c) Kind | Amount (parts) | Catalyst (d) Kind | Amount (parts) | Surfactant (x) Kind | Amount (parts) | Polymerization temperature (°C.) |
|---|---|---|---|---|---|---|---|---|---|---|---|
| | Acrylic acid | 3 | | | | | | | | | |

*: Numeral values without parentheses denote the amount of a portion initially charged into the flask, and numeral values in parentheses denote the amount of a dropped portion.

TABLE 2-2

| EX-AMPLE | Vinyl-based monomer (a) Kind | Amount (parts) | Alcohol (b) Kind | Amount* (parts) | Initiator (c) Kind | Amount (parts) | Catalyst (d) Kind | Amount (parts) | Surfactant (x) Kind | Amount (parts) | Polymerization temperature (°C.) |
|---|---|---|---|---|---|---|---|---|---|---|---|
| 2-7 | 2-Ethylhexyl acrylate | 63 | Ethylene glycol monoacetate | 308 (77) | Benzoyl peroxide | 3.6 | Sulfuric acid | 1.0 | — | — | 110 |
| | Butyl acrylate | 63 | | | | | | | | | |
| | Vinyl acetate | 8 | | | | | | | | | |
| | Acrylic acid | 3 | | | | | | | | | |
| 2-8 | Ethyl acrylate | 100 | Ethylene glycol monoacetate | 308 (77) | Tertiary-butyl-peroxy pivalate | 3.5 | Nitric acid (70%) | 0.5 | — | — | 80 |
| 2-9 | Butyl acrylate | 128 | Ethylene glycol | 320 (70) | Tertiary-butyl-peroxy pivalate | 7.0 | Nitric acid (70%) | 1.5 | — | — | 90 |
| | | | Trimethylolpropane | 60 | | | | | | | |

*: Numeral values without parentheses denote the amount of a portion initially charged into the flask, and numeral values in parentheses denote the amount of a dropped portion.

TABLE 2-3

| EX-AMPLE | Vinyl-based monomer (a) Kind | Amount (parts) | Alcohol (b) Kind | Amount* (parts) | Initiator (c) Kind | Amount (parts) | Catalyst (d) Kind | Amount (parts) | Surfactant (x) Kind | Amount (parts) | Polymerization temperature (°C.) |
|---|---|---|---|---|---|---|---|---|---|---|---|
| 2-10 | Methyl methacrylate | 100 | Trimethylolpropane | 200 | Diisopropylbenzene hydroperoxide | 4.0 | Nitric acid (70%) | 1.5 | — | — | 140 |
| | | | Glycerol | (50) | | | | | | | |
| 2-11 | Methyl methacrylate | 90 | Trimethylolpropane | 200 | Diisopropylbenzene hydroperoxide | 2.0 | Nitric acid (70%) | 1.5 | — | — | 140 |
| | 2-Hydroxyethyl methacrylate | 10 | Glycerol | (50) | | | | | | | |
| 2-12 | Butyl acrylate | 128 | Ethyl cellosolve | 250 (50) | Tertiary-butyl-peroxy pivalate | 7.0 | Nitric acid (70%) | 1.5 | — | — | 90 |
| 2-13 | Methyl methacrylate | 100 | Ethylene glycol monoacetate | 258 (50) | Tertiary-butyl-peroxy pivalate | 7.0 | Perchloric acid (60%) | 2.2 | — | — | 90 |

*: Numeral values without parentheses denote the amount of a portion initially charged into the flask, and numeral values in parentheses denote the amount of a dropped portion.

TABLE 2-4

| EX-AMPLE | Vinyl-based monomer (a) Kind | Amount (parts) | Alcohol (b) Kind | Amount* (parts) | Initiator (c) Kind | Amount (parts) | Catalyst (d) Kind | Amount (parts) | Surfactant (x) Kind | Amount (parts) | Polymerization temperature (°C.) |
|---|---|---|---|---|---|---|---|---|---|---|---|
| 2-14 | Methyl methacrylate | 60 | Ethylene glycol monoacetate | 258 (50) | Benzoyl peroxide | 3.6 | Perchloric acid (60%) | 6.6 | — | — | 100 |
| | Butyl | 45 | | | | | | | | | |

TABLE 2-4-continued

| EX-AMPLE | Vinyl-based monomer (a) Kind | Amount (parts) | Alcohol (b) Kind | Amount* (parts) | Initiator (c) Kind | Amount (parts) | Catalyst (d) Kind | Amount (parts) | Surfactant (x) Kind | Amount (parts) | Polymerization temperature (°C.) |
|---|---|---|---|---|---|---|---|---|---|---|---|
| | acrylate Acrylic acid | 3 | | | | | | | | | |
| 2-15 | Methyl acrylate | 86 | Ethylene glycol n-Butanol | 100 (20) 60 (20) | Cyclohexanone peroxide | 2.0 | Hydrochloric acid (35%) Sulfuric acid | 1.1 1.0 | — | — | 140 |
| 2-16 | Methyl methacrylate γ-Methacryloyloxytrimethoxysilane | 90 10 | Ethylene glycol | 160 (40) | Cyclohexanone peroxide | 2.0 | Hydrochloric acid (35%) | 1.1 | — | — | 140 |
| 2-17 | Butyl acrylate Acrylonitrile | 110 15 | Ethylene glycol Pentaerythritol | 160 (40) 20 | Lauroyl peroxide | 4.0 | Hydrochloric acid (35%) | 1.1 | — | — | 80 |

*: Numeral values without parentheses denote the amount of a portion initially charged into the flask, and numeral values in parentheses denote the amount of a dropped portion.

TABLE 2-5

| EX-AMPLE | Vinyl-based monomer (a) Kind | Amount (parts) | Alcohol (b) Kind | Amount* (parts) | Initiator (c) Kind | Amount (parts) | Catalyst (d) Kind | Amount (parts) | Surfactant (x) Kind | Amount (parts) | Polymerization temperature (°C.) |
|---|---|---|---|---|---|---|---|---|---|---|---|
| 2-18 | Butyl acrylate Styrene | 110 20 | Ethylene glycol Pentaerythritol | 160 (40) 20 | Cyclohexanone peroxide Manganese naphthenate | 2.0 0.3 | Hydrobromic acid (47%) | 2.0 | — | — | 40 |
| 2-19 | Styrene | 104 | Ethylene glycol monoacetate | 258 (50) | Lauroyl peroxide | 2.0 | Hydroiodic acid | 1.4 | SPAN-60 | 3.0 | 80 |
| 2-20 | Styrene Phenylmaleimide | 90 15 | Ethylene glycol Ethylene glycol monoacetate | 160 (40) 50 | Cyclohexanone peroxide | 1.0 | Hydrofluoric acid (46%) | 0.6 | SPAN-60 | 3.0 | 140 |

*: Numeral values without parentheses denote the amount of a portion initially charged into the flask, and numeral values in parentheses denote the amount of a dropped portion.

TABLE 2-6

| EX-AMPLE | Vinyl-based monomer (a) Kind | Amount (parts) | Alcohol (b) Kind | Amount* (parts) | Initiator (c) Kind | Amount (parts) | Catalyst (d) Kind | Amount (parts) | Surfactant (x) Kind | Amount (parts) | Polymerization temperature (°C.) |
|---|---|---|---|---|---|---|---|---|---|---|---|
| 2-21 | Butyl acrylate Cyclohexyl methacrylate | 100 34 | Ethylene glycol Ethylene glycol monoacetate | 160 (40) 50 | Cyclohexanone peroxide | 2.0 | Molecular Sieves 4A 1/16 (made by Wako Pure Chemical Industries LTD.) | 2.0 | PELEX OT-P | 3.0 | 140 |
| 2-22 | Styrene Cyclohexyl methacrylate Methyl methacrylate Methacrylic | 40 30 10 2 | Ethylene glycol | 320 (80) | Cyclohexanone peroxide | 4.0 | Molecular Sieves 4A 1/16 (made by Wako Pure Chemical Industries LTD.) | 4.0 | — | — | 140 |

TABLE 2-6-continued

| EXAMPLE | Vinyl-based monomer (a) | | Alcohol (b) | | Initiator (c) | | Catalyst (d) | | Surfactant (x) | | Polymerization temperature (°C.) |
|---|---|---|---|---|---|---|---|---|---|---|---|
| | Kind | Amount (parts) | Kind | Amount* (parts) | Kind | Amount (parts) | Kind | Amount (parts) | Kind | Amount (parts) | |
| | acid | | | | | | | | | | |

*: Numeral values without parentheses denote the amount of a portion initially charged into the flask, and numeral values in parentheses denote the amount of a dropped portion.

TABLE 2-7

| Polymer | Polymerization conversion (%) | Number-average molecular weight | Mw/Mn | Fn (OH) | Gel portion percent (%) A | Gel portion percent (%) B |
|---|---|---|---|---|---|---|
| (2-4) | 93 | 4000 | 2.5 | 3.5 | 97 | 95 |
| (2-5) | 93 | 16000 | 2.5 | 3.0 | 94 | 88 |
| (2-6) | 93 | 85000 | 2.8 | 2.8 | 88 | 85 |
| (2-7) | 90 | 4500 | 2.5 | 1.6 | 87 | 3 |
| (2-8) | 85 | 5000 | 2.3 | 1.7 | 90 | 3 |
| (2-9) | 89 | 3000 | 2.5 | 4.1 | 100 | 91 |
| (2-10) | 88 | 8000 | 2.8 | 4.8 | 99 | 95 |
| (2-11) | 89 | 14000 | 2.3 | 12.8 | 100 | 96 |
| (2-12) | 89 | 4600 | 2.9 | 1.7 | 88 | 2 |
| (2-13) | 88 | 6000 | 3.0 | 1.6 | 86 | 3 |
| (2-14) | 89 | 6500 | 2.6 | 1.6 | 89 | 3 |
| (2-15) | 90 | 6800 | 2.8 | 2.9 | 94 | 85 |
| (2-16) | 90 | 5600 | 2.2 | 3.5 | 96 | 89 |
| (2-17) | 86 | 4600 | 2.0 | 3.7 | 98 | 90 |
| (2-18) | 85 | 3000 | 2.6 | 3.8 | 100 | 90 |
| (2-19) | 88 | 9000 | 2.2 | 1.6 | 88 | 4 |
| (2-20) | 89 | 18000 | 2.5 | 2.8 | 90 | 84 |
| (2-21) | 88 | 8500 | 3.3 | 3.1 | 95 | 91 |
| (2-22) | 89 | 3500 | 2.5 | 3.2 | 95 | 90 |

TABLE 2-8

| EXAMPLE | Vinyl-based monomer (a) Kind | Amount (parts) | Alcohol (b) Kind | Amount* (parts) | Initiator (c) Kind | Amount (parts) | Catalyst (d) Kind | Amount (parts) | Surfactant (x) Kind | Amount (parts) | Polymerization temperature (°C.) |
|---|---|---|---|---|---|---|---|---|---|---|---|
| 2-26 | Butyl acrylate | 67 | Ethylene glycol | 320 (70) | Cyclohexanone peroxide | 4.4 | Phosphoric acid | 1.0 | — | — | 140 |
| | Methyl methacrylate | 45 | | | | | | | | | |
| | Acrylic acid | 3 | | | | | | | | | |
| 2-27 | Butyl acrylate | 45 | Ethylene glycol | 100 (20) | Benzoyl peroxide | 3.6 | Polyphosphoric acid | 0.5 | — | — | 110 |
| | Acrylonitrile | 35 | Ethanol | 30 (10) | | | | | | | |
| | Methyl methacrylate | 17 | | | | | | | | | |
| | Acrylic acid | 3 | | | | | | | | | |
| 2-28 | 2-Ethylhexyl acrylate | 63 | Ethylene glycol | 100 (20) | Benzoyl peroxide | 0.4 | Polyphosphoric acid | 0.5 | — | — | 100 |
| | Butyl acrylate | 63 | Ethanol | 60 (20) | | | | | | | |
| | Vinyl acetate | 8 | | | | | | | | | |
| | Acrylic acid | 3 | | | | | | | | | |

*: Numeral values without parentheses denote the amount of a portion initially charged into the flask, and numeral values in parentheses denote the amount of a dropped portion.

TABLE 2-9

| EXAMPLE | Vinyl-based monomer (a) Kind | Amount (parts) | Alcohol (b) Kind | Amount* (parts) | Initiator (c) Kind | Amount (parts) | Catalyst (d) Kind | Amount (parts) | Surfactant (x) Kind | Amount (parts) | Polymerization temperature (°C.) |
|---|---|---|---|---|---|---|---|---|---|---|---|
| 2-29 | 2-Ethylhexyl acrylate | 63 | Ethylene glycol monoacetate | 308 (77) | Benzoyl peroxide | 3.6 | Polyphosphoric acid | 1.0 | — | — | 110 |
| | Butyl acrylate | 63 | | | | | | | | | |
| | Vinyl acetate | 8 | | | | | | | | | |
| | Acrylic acid | 3 | | | | | | | | | |
| 2-30 | Ethyl | 100 | Ethylene | 308 | Tertiary- | 3.5 | Phosphoric | 0.5 | — | — | 80 |

TABLE 2-9-continued

| EX-AM-PLE | Vinyl-based monomer (a) | | Alcohol (b) | | Initiator (c) | | Catalyst (d) | | Surfactant (x) | | Polymerization temperature (°C.) |
|---|---|---|---|---|---|---|---|---|---|---|---|
| | Kind | Amount (parts) | Kind | Amount* (parts) | Kind | Amount (parts) | Kind | Amount (parts) | Kind | Amount (parts) | |
| | acrylate | | glycol mono-acetate | (77) | butyl-peroxy pivalate | | acid | | | | |
| 2-31 | Butyl acrylate | 128 | Ethylene glycol Trimethyl-olpropane | 320 (70) 60 | Tertiary-butyl-peroxy pivalate | 7.0 | Phosphoric acid | 1.5 | — | — | 90 |

*: Numeral values without parentheses denote the amount of a portion initially charged into the flask, and numeral values in parentheses denote the amount of a dropped portion.

TABLE 2-10

| EX-AM-PLE | Vinyl-based monomer (a) | | Alcohol (b) | | Initiator (c) | | Catalyst (d) | | Surfactant (x) | | Polymerization temperature (°C.) |
|---|---|---|---|---|---|---|---|---|---|---|---|
| | Kind | Amount (parts) | Kind | Amount* (parts) | Kind | Amount (parts) | Kind | Amount (parts) | Kind | Amount (parts) | |
| 2-32 | Methyl methacrylate | 100 | Trimethyl-olpropane Glycerol | 200 (50) | Diisopropylbenzene hydroperoxide | 4.0 | Phosphoric acid | 1.5 | — | — | 140 |
| 2-33 | Methyl methacrylate 2-Hydroxy-ethyl methacrylate | 90 10 | Trimethyl-olpropane Glycerol | 200 (50) | Diisopropylbenzene hydroperoxide | 2.0 | Phosphoric acid | 1.5 | — | — | 140 |
| 2-34 | Butyl acrylate | 128 | Ethyl cellosolve | 250 (50) | Tertiary-butyl-peroxy pivalate | 7.0 | Phosphoric acid | 1.5 | — | — | 90 |
| 2-35 | Methyl methacrylate | 100 | Ethylene glycol mono-acetate | 258 (50) | Tertiary-butyl-peroxy pivalate | 7.0 | Phosphoric acid | 1.5 | — | — | 90 |

*: Numeral values without parentheses denote the amount of a portion initially charged into the flask, and numeral values in parentheses denote the amount of a dropped portion.

TABLE 2-11

| EX-AM-PLE | Vinyl-based monomer (a) | | Alcohol (b) | | Initiator (c) | | Catalyst (d) | | Surfactant (x) | | Polymerization temperature (°C.) |
|---|---|---|---|---|---|---|---|---|---|---|---|
| | Kind | Amount (parts) | Kind | Amount* (parts) | Kind | Amount (parts) | Kind | Amount (parts) | Kind | Amount (parts) | |
| 2-36 | Methyl methacrylate Butyl acrylate Acrylic acid | 60 45 3 | Ethylene glycol mono-acetate | 258 (50) | Benzoyl peroxide | 3.6 | Phosphoric acid | 4.0 | — | — | 100 |
| 2-37 | Methyl methacrylate γ-Methacryloyloxy-trimethoxysilane | 90 10 | Ethylene glycol | 160 (40) | Cyclohexanone peroxide | 2.0 | Phosphoric acid | 1.5 | — | — | 140 |
| 2-38 | Butyl acrylate Acrylonitrile | 110 15 | Ethylene glycol Pentaerythritol | 160 (40) 20 | Lauroyl peroxide | 4.0 | Phosphoric acid | 1.5 | — | — | 80 |

*: Numeral values without parentheses denote the amount of a portion initially charged into the flask, and numeral values in parentheses denote the amount of a dropped portion.

TABLE 2-12

| EX-AMPLE | Vinyl-based monomer (a) Kind | Vinyl-based monomer (a) Amount (parts) | Alcohol (b) Kind | Alcohol (b) Amount* (parts) | Initiator (c) Kind | Initiator (c) Amount (parts) | Catalyst (d) Kind | Catalyst (d) Amount (parts) | Surfactant (x) Kind | Surfactant (x) Amount (parts) | Polymerization temperature (°C.) |
|---|---|---|---|---|---|---|---|---|---|---|---|
| 2-39 | Butyl acrylate | 110 | Ethylene glycol | 160 (40) | Cyclohexanone peroxide | 2.0 | Phosphoric acid | 1.5 | — | — | 40 |
|  | Styrene | 20 | Pentaerythritol | 20 | Manganese naphthenate | 0.3 |  |  |  |  |  |
| 2-40 | Styrene | 104 | Ethylene glycol monoacetate | 258 (50) | Lauroyl peroxide | 2.0 | Phosphoric acid | 1.5 | SPAN-60 | 3.0 | 80 |
| 2-41 | Styrene | 90 | Ethylene glycol | 160 (40) | Cyclohexanone peroxide | 1.0 | Phosphoric acid | 1.5 | SPAN-60 | 3.0 | 140 |
|  | Phenylmaleimide | 15 | Ethylene glycol monoacetate | 50 |  |  |  |  |  |  |  |

*: Numeral values without parentheses denote the amount of a portion initially charged into the flask, and numeral values in parentheses denote the amount of a dropped portion.

TABLE 2-13

| Polymer | Polymerization conversion (%) | Number-average molecular weight | Mw/Mn | Fn (OH) | Gel portion percent (%) A | Gel portion percent (%) B |
|---|---|---|---|---|---|---|
| (2-26) | 78 | 2900 | 2.1 | 3.1 | 94 | 88 |
| (2-27) | 76 | 13000 | 2.9 | 2.8 | 91 | 83 |
| (2-28) | 76 | 65000 | 3.0 | 2.8 | 86 | 75 |
| (2-29) | 72 | 3400 | 2.5 | 1.5 | 80 | 2 |
| (2-30) | 75 | 3800 | 2.0 | 1.6 | 83 | 3 |
| (2-31) | 80 | 2300 | 2.5 | 3.2 | 95 | 90 |
| (2-32) | 74 | 6500 | 2.2 | 3.9 | 98 | 96 |
| (2-33) | 76 | 12000 | 2.6 | 11.0 | 100 | 98 |
| (2-34) | 76 | 3900 | 2.4 | 1.5 | 78 | 2 |
| (2-35) | 78 | 5000 | 2.0 | 1.5 | 80 | 3 |
| (2-36) | 73 | 5000 | 2.5 | 1.5 | 77 | 1 |
| (2-37) | 77 | 4500 | 2.4 | 2.9 | 90 | 83 |
| (2-38) | 75 | 3600 | 2.1 | 3.0 | 95 | 88 |
| (2-39) | 81 | 2000 | 2.0 | 3.1 | 96 | 86 |
| (2-40) | 78 | 7800 | 2.6 | 1.5 | 82 | 2 |
| (2-41) | 76 | 15000 | 2.8 | 2.4 | 93 | 75 |

EXAMPLE 3-1

Into a flask equipped with a stirrer, nitrogen-introducing tube, thermometer and reflux condenser was charged 67 parts of ethylene glycol. An inside atmosphere of the flask was replaced by nitrogen, and then the temperature was raised up to 140° C. while introducing a nitrogen gas slowly. After the inside temperature of the reaction vessel became stable, a mixed liquid made by dissolving 1.7 parts of dodecylbenzenesulfonic acid in 60 parts of butyl acrylate and 40 parts of methyl methacrylate and another mixed liquid comprising 3.6 parts of a 60% aqueous hydrogen peroxide solution and 33 parts of ethylene glycol were added dropwise during 1 hour respectively, and then stirring was continued at 140° C. for 10 minutes to complete a polymerization reaction.

Sequentially, an extracting solvent comprising toluene and water was used and a polymer was separated by extracting it from a reaction mixture containing the polymer, whereby a toluene solution containing the polymer was obtained. Toluene was removed by evaporating it, and furthermore, the residue was dried at 45° C. under a reduced pressure to obtain a purified polymer (3-1).

Physical properties of the purified polymer (3-1) were shown in TABLE 3-2.

The average number (Fn(OH)) of terminal hydroxyl groups of the purified polymer (3-1) was 3.9 (mole/polymer 1 mole). However, the Fn(OH) of the purified polymer (3-1), corrected by measuring the ethylene glycol content in the purified polymer (3-1), was 3.6 (mole/polymer 1 mole).

EXAMPLE 3-2

A polymerization reaction was performed in a manner similar to EXAMPLE 3-1 except that the kind of the vinyl-based monomer (a) and alcohol (b) was changed as shown in TABLE 3-1. Sequentially, the purification process similar to EXAMPLE 3-1 was performed to obtain a purified polymer (3-2).

Physical properties of the purified polymer (3-2) were shown in TABLE 3-2.

EXAMPLE 3-3

A twin screw extruder equipped with an outside jacket (inner diameter 1 inch, L/D=48, barrel number 8, screw SACM-made 645, shaft SNCM-made 439, others SACM-made 645) was furnished with openings for supplying a raw material and taking out a product and, in addition to these, another opening for supplying a raw material in the middle of the above openings. A mixture prepared by mixing each 50% portion of the vinyl-based monomer (a), initiator (c) and catalyst (d) with a total amount of the alcohol (b) shown in TABLE 3-1 was continuously supplied from the former opening for supplying a raw material into the extruder at a flow rate of 15 ml per minute using a plunger pump. Next, another mixture prepared by mixing each residual 50% portion of the vinyl-based monomer (a), initiator (c) and catalyst (d) was continuously supplied from the latter opening for supplying a raw material at a flow rate of 5 ml per minute using a plunger pump, and a heating medium was run in the jacket so as to stabilize the inner temperature at the polymerization temperature shown in TABLE 3-1, whereby a continuous polymerization reaction was performed.

Sequentially, the purification process similar to EXAMPLE 3-1 was performed to obtain a purified polymer (3-3).

Physical properties of the purified polymer (3-3) were shown in TABLE 3-2.

EXAMPLE 3-4

A KRC kneader equipped with an outside jacket (inner diameter 2 inches, L/D=13.2, effective inner volume 1.2 liters, made by Kurimoto Tekkosho Co., Ltd. ) was furnished with openings for supplying a raw material and taking out a product. Into this kneader was continuously supplied a mixture of the vinyl-based monomer (a), alcohol (b), initiator (c) and catalyst (d) shown in TABLE 3-1 at a flow rate of 20 ml per minute using a plunger pump, and the paddle-rotating number was adjusted at 20 rpm, and heating medium was run in the jacket so as to have an average residence time of 30 minutes at a stationary state and to stabilize the inner temperature at the polymerization temperature shown in TABLE 3-1, whereby a continuous polymerization reaction was performed. Sequentially, the purification process similar to EXAMPLE 3-1 was performed to obtain a purified polymer (3-4).

Physical properties of the purified polymer (3-4) were shown in TABLE 3-2.

COMPARATIVE EXAMPLE 3-1

Into a flask equipped with a stirrer, nitrogen-introducing tube, thermometer and reflux condenser were charged 100 parts of butyl acrylate, 4 parts of ethylene glycol and 3.6 parts of a 60% aqueous hydrogen peroxide solution. An inside atmosphere of the flask was replaced by nitrogen, and then the temperature was raised up to 140° C. while introducing a nitrogen gas slowly, and stirring was continued at the same temperature for 10 minutes to complete a polymerization reaction.

Sequentially, an extracting solvent comprising toluene and water was used and a polymer was separated by extracting it from a reaction mixture containing the polymer, whereby a toluene solution containing the polymer was obtained. Toluene was removed by evaporating it, and furthermore, the residue was dried at 45° C. under a reduced pressure to obtain a purified comparative polymer (3-1). Sequentially, the purification process similar to EXAMPLE 3-1 was performed to obtain a purified comparative polymer (3-1).

Physical properties of the purified comparative polymer (3-1) were shown in TABLE 3-4.

COMPARATIVE EXAMPLE 3-2

A polymerization reaction was performed in a manner similar to EXAMPLE 3-1 except that the kind and proportion of the vinyl-based monomer (a), alcohol (b) and initiator (c) were defined as shown in TABLE 3-3. Sequentially, the purification process similar to EXAMPLE 3-1 was performed to obtain a purified comparative polymer (3-2).

Physical properties of the purified comparative polymer (3-2) were shown in TABLE 3-4.

COMPARATIVE EXAMPLE 3-3

The procedure of EXAMPLE 3-1 was repeated except that the kind and proportion of the vinyl-based monomer (a), alcohol (b) and initiator (c) were defined as shown in TABLE 3-3, and that 50 parts of toluene was used as a component other than the (a), (b) and (c) (as a solvent). Thereby a purified comparative polymer (3-3) was obtained.

Physical properties of the purified comparative polymer (3-3) were shown in TABLE 3-4.

EXAMPLE 3-5

Into a flask equipped with a stirrer, nitrogen-introducing tube, thermometer and reflux condenser was charged 67 parts of isobutanol. An inside atmosphere of the flask was replaced by nitrogen, and then the temperature was raised up to 140° C. while introducing a nitrogen gas slowly. After the inside temperature of the reaction vessel became stable, a mixed liquid made by dissolving 1.7 parts of dodecylbenzenesulfonic acid in 100 parts of butyl acrylate and another mixed liquid comprising 3.6 parts of a 60% aqueous hydrogen peroxide solution and 33 parts of ethylene glycol were simultaneously added dropwise during 1 hour respectively, and then stirring was continued at 140° C. for 10 minutes to complete a polymerization reaction. Sequentially, the resulting reaction mixture was washed by toluene and an aqueous saturated solution of sodium hydrogen carbonate to separate a toluene layer, and the toluene layer was subjected to a purification process by a thin membrane evaporator, whereby a polymer (3-5) was obtained.

For the purified polymer (3-5), the number-average molecular weight (Mn) was 5,600 and the average number (Fn(OH)) of terminal hydroxyl groups was 1.7 (mole/polymer 1 mole).

TABLE 3-1

| EX-AMPLE | Vinyl-based monomer (a) Kind | Amount (parts) | Alcohol (b) Kind | Amount (parts) | Initiator (c) Kind | Amount (parts) | Catalyst (d) Kind | Amount (parts) | Polymerization apparatus | Polymerization method |
|---|---|---|---|---|---|---|---|---|---|---|
| 3-1 | Methyl methacrylate | 40 | Ethylene glycol | 100 | Hydrogen peroxide (60%) | 3.6 | Dodecylbenzene sulfonic acid | 1.7 | Flask batch polymerization | *1 |
|  | Butyl acrylate | 60 |  |  |  |  |  |  |  |  |
| 3-2 | Methyl methacrylate | 92 | Bis(hydroxyethyl) sulfone | 100 | Hydrogen peroxide (60%) | 3.6 | Dodecylbenzene sulfonic acid | 1.7 | Flask batch polymerization | *1 |
|  | Acrylic acid | 3 |  |  |  |  |  |  |  |  |
|  | Hydroxyethyl methacrylate | 5 |  |  |  |  |  |  |  |  |
| 3-3 | Methyl methacrylate | 90 | Propylene glycol | 50 | Hydrogen peroxide (60%) | 4.0 | Titanium oxide | 0.5 | Twin screw extruder | *2 |
|  | 2-Perfluo- | 10 | Ethylene glycol | 50 |  |  |  |  |  |  |

TABLE 3-1-continued

| EX-AM-PLE | Vinyl-based monomer (a) | | Alcohol (b) | | Initiator (c) | | Catalyst (d) | | Polymerization apparatus | Polymerization method |
|---|---|---|---|---|---|---|---|---|---|---|
| | Kind | Amount (parts) | Kind | Amount (parts) | Kind | Amount (parts) | Kind | Amount (parts) | | |
| 3-4 | rooctylethyl methacrylate 2-Ethylhexyl acrylate Styrene Acrylonitrile | 74 24 2 | Glucose (50% aqueous solution) | 50 | Hydrogen peroxide (60%) | 3.2 | Hydrochloric acid | 0.1 | KRC kneader | *3 |

*1: The two-third amount of the (b) was initially charged, the residual amount of the (b) and the total amount of the (a), (c) and (d) were continuously added dropwise at 140° C. during 60 minutes, and then maturing was performed for 10 minutes.
*2: Method of supplying continuously a lump mixture under conditions of 160° C. and average residence time of 30 minutes and supplying 50% of the (a), (c) and (d) on the way.
*3: Method of supplying continuously a lump mixture under conditions of 100° C. and average residence time of 30 minutes and supplying the hydrochloric acid from another feed line.

TABLE 3-2

| Polymer | Polymerization conversion (%) | Number-average molecular weight | Fn(OH) *1 | Gel portion percent (%) | |
|---|---|---|---|---|---|
| | | | | A | B |
| (3-1) | 95 | 11000 | 3.6 | 95 | 96 |
| (3-2) | 88 | 12000 | 8.5 | 99 | 97 |
| (3-3) | 87 | 45000 | 3.3 | 89 | 83 |
| (3-4) | 88 | 23000 | 7.9 | 91 | 88 |

*1: An OH value measured according to JIS-K-1557 was corrected by analyzing the amount of a residual alcohol in the polymer, and on the basis of the corrected OH value and a value of the number-average molecular weight there was calculated the average number (Fn(OH)) of terminal hydroxyl groups.

TABLE 3-3

| COMPARATIVE EXAMPLE | Vinyl-based monomer (a) | | Alcohol (b) | | Initiator (c) | | Polymerization apparatus | Polymerization method |
|---|---|---|---|---|---|---|---|---|
| | Kind | Amount (parts) | Kind | Amount (parts) | Kind | Amount (parts) | | |
| 3-1 | Butyl acrylate | 100 | Ethylene glycol | 4 | Hydrogen peroxide (60%) | 3.6 | Flask batch polymerization | *1 |
| 3-2 | Cyclohexyl methacrylate | 100 | Ethylene glycol | 20 | Hydrogen peroxide (60%) | 1.5 | Flask batch polymerization | *1 |
| 3-3 | Cyclohexyl methacrylate | 100 | Ethylene glycol | 50 | Hydrogen peroxide (60%) | 4.0 | Flask batch polymerization (Toluene: 50 parts) | *2 |

*1: The total amount of the (a), (b) and (c) was charged in one lot, and stirring was performed at 140° C. for 10 minutes.
*2: The two-third amount of the (b) and the total amount of the toluene were initially charged, the residual amount of the (b) and the total amount of the (a) and (c) were continuously added dropwise at 140° C. during 60 minutes, and then maturing was performed for 10 minutes.

TABLE 3-4

| Comparative polymer | Polymerization conversion (%) | Number-average molecular weight | Fn (OH) *1 | Gel portion percent (%) | |
|---|---|---|---|---|---|
| | | | | A | B |
| (3-1) | 92 | 15000 | 2.6 | 92 | 91 |
| (3-2) | 85 | 25000 | 2.7 | 93 | 89 |
| (3-3) | 85 | 2200 | 0.3 | 3 | 7 |

*1: An OH value measured according to JIS-K-1557 was corrected by analyzing the amount of a residual alcohol in the polymer, and on the basis of the corrected OH value and a value of the number-average molecular weight there was calculated the average number (Fn(OH)) of terminal hydroxyl groups.

INDUSTRIAL APPLICATION

According to the production process of this invention, a polymer having a hydroxyl group at both terminals (a polymer (A)) can be easily obtained with a cheap price and good efficiency from a wide field of vinyl-based monomers including polar vinyl-based monomers such as acrylic acid, an acrylic acid ester, methacrylic acid, a methacrylic acid ester and the like.

The polymer (A) obtained by this production process, because of the presence of a hydroxyl group at both terminals, is in itself very useful as a raw material or an additive for various resins such as a polyester resin, a polyurethane resin, a polycarbonate resin, various block polymers and the like, and furthermore, the polymer itself is very useful for uses such as a coating (a high solid coating, a low temperature curing coating, a water borne two-liquid type urethane coating, a powder coating and the like), an elastic wall material, waterproof for paint film, a pressure-sensitive adhesive, a floor material, a tackifier, an adhesive, binders (a magnetic recording medium, an ink binder, a casting binder, a burned brick binder, a graft material, a microcapsule, glass fiber sizing and the like), a sealant, urethane foam (hard, semihard, and soft type), urethane RIM, an UV-EB-curing resin, thermosetting type elastomer, thermoplastic elastomer, microcellular, a fiber-processing agent, a plasticizer, a sound absorption material, a vibration-controlling material, a surfactant, a gel coat agent, a resin for artificial marble, an impact resistance-affording agent for artificial marble, a resin for ink, a film (a laminate adhesive, a protective film and the like), a resin for laminated glass, a reactive diluent, various molding materials, elastic fiber, artificial leather, synthetic leather, a dispersing agent, an aqueous urethane emulsion and the like. Furthermore, the polymer (A) can be easily converted into a polymer having a functional group other than a hydroxyl group (for example, a polymerizable unsaturated group, such as a vinyl group and the like, a formyl group, an amino group, a carboxyl group, an ethynyl group, an epoxy group, a silanol group, an alkoxysilyl group, a hydroxysilyl group, a mercapto group, an oxazoline group, a maleimide group, an azlactone group, a lactone group, bromine, chlorine and the like) at both terminals by carrying out a suitable reaction on both the terminal hydroxyl groups of the polymer (1). The thus-obtained polymers are also very useful. For example, a polymer having a carboxyl group at both terminals is very effective as an impact resistance-affording agent for epoxy adhesives. Furthermore, a raw material for surfactants, urethane foam, a water-reducing cement admixture, a compatibilizer and the like is obtained by adding a plural of ethylene oxide or propylene oxide to the terminal hydroxyl groups of the polymer (A).

When a composition which contains, as essential components, the polymer (A), obtained from the production process of this invention, and a polyfunctional compound (f) having two or more of a functional group capable of reacting with a hydroxyl group per one molecule (a composition (A)) is used as a raw material for various resins such as a polyester resin, a polyurethane resin, a polycarbonate resin and the like, various block polymers, a coating (a high solid coating, low temperature curing coating, a water borne two-liquid type urethane coating, a powder coating and the like), an elastic wall material, waterproof for paint film, a pressure-sensitive adhesive, a floor material, a tackifier, an adhesive, binders (a magnetic recording medium, an ink binder, a casting binder, a burned brick binder, a graft material, a microcapsule, glass fiber sizing and the like), a sealant, urethane foam (hard, semihard, and soft type), urethane RIM, an UV-EB-curing resin, thermosetting type elastomer, thermoplastic elastomer, microcellular, a fiber-processing agent, a plasticizer, a sound absorption material, a vibration-controlling material, a surfactant, a gel coat agent, a resin for artificial marble, an impact resistance-affording agent for artificial marble, a resin for ink, a film (a laminate adhesive, a protective film and the like), a resin for laminated glass, a reactive diluent, various molding materials, elastic fiber, artificial leather, synthetic leather, a dispersing agent, an aqueous urethane emulsion and the like, or used as various resin additives and a raw material therefor and the like, the composition (A) has soft and tough mechanical properties, and furthermore, it displays excellence sufficiently in properties such as transparency, weather resistance, resistance, water resistance, hydrolysis resistance, chemical resistance and the like depending upon the kind of the vinyl-based monomer (a) constituting a main chain of the polymer (A).

In a case of using the composition (A) for a sealant, if the polymer (A) is combined with an isocyanate compound hitherto-known in public and the like, the resulting sealant is soft and tough and there are obtained effects on weather resistance, heat resistance, water resistance, chemical resistance, contamination resistance and tack which have not been seen in any conventional sealant composition. Furthermore, the sealant in which the composition (A) is used is superior in heat resistance compared with a sealant which contains a polyether polyol of present use as a main component of a resin for the sealant.

We claim:

1. A process for producing a polymer, consisting essentially of polymerizing a vinyl-based monomer (a) in a reactor in the presence of
   (i) an alcohol (b) having no addition-polymerizing activity;
   (ii) an initiator (c) consisting essentially of a peroxide; and
   (iii) a catalyst (d) selected from the group consisting of an organic sulfonic acid having no addition-polymerization reactivity and an inorganic acid;
   thereby producing a polymer having a hydroxyl group at both terminals, wherein said reactor does not substantially contain any component other than the (a), (b), (c) and (d).

2. The process as claimed in claim 1, wherein a surfactant (x) is present in said reactor in an amount smaller than 10% by weight based on the amount of the entire contents of the reactor.

3. The process as claimed in claim 1, wherein the vinyl-based monomer (a) is at least one member selected from the group consisting of methacrylic acid, a methacrylic acid ester, acrylic acid, an acrylic acid ester and styrene.

4. The process as claimed in claim 1, wherein the alcohol (b) is at least one member selected from the group consisting of ethylene glycol, 1,2-propanediol and isobutanol.

5. The process as claimed in claim 1, wherein the peroxide is at least one member selected from the group consisting of hydrogen peroxide, cyclohexanone peroxide and benzoyl peroxide.

6. The process as claimed in claim 1, wherein the catalyst (d) is at least one member selected from the group consisting of p-toluenesulfonic acid, dodecylbenzenesulfonic acid, hydrochloric acid and sulfuric acid.

7. The process as claimed in claim 1, wherein said catalyst (d) is present in said reactor in an amount 0.05-10% by weight based on the amount of the entire contents of the reactor.

8. The process as claimed in claim 1, wherein said initiator (c) is present in said reactor in an amount 0.01-20% by weight based on the vinyl-based monomer (a).

9. The process as claimed in claim 1, wherein a ratio of said alcohol (b)/said vinyl-based monomer (a) is in a range of 0.1-10.

10. The process as claimed in claim 1, wherein a molecular weight of said alcohol (b) is 200 or lower.

11. A process for producing a polymer, comprising polymerizing a vinyl-based monomer (a) in a reactor in the presence of
    (i) an alcohol (b) having no addition-polymerizing activity;
    (ii) an initiator (c) consisting essentially of a peroxide; and
    (iii) a catalyst (d) selected from the group consisting of an organic sulfonic acid having no addition-polymerization reactivity and an inorganic acid;
    thereby producing a polymer having a hydroxyl group at both terminals, wherein said components (a)-(d) comprise at least 90% by weight of the entire contents of the reactor.

12. The process as claimed in claim 11, wherein a surfactant (x) is present in said reactor in an amount smaller than 10% by weight based on the amount of the entire contents of the reactor.

13. The process as claimed in claim 11, wherein the vinyl-based monomer (a) is at least one member selected from the group consisting of methacrylic acid, a methacrylic acid ester, acrylic acid, an acrylic acid ester and styrene.

14. The process as claimed in claim 11, wherein the alcohol (b) is at least one member selected from the group consisting of ethylene glycol, 1,2-propanediol and isobutanol.

15. The process as claimed in claim 11, wherein the peroxide is at least one member selected from the group consisting of hydrogen peroxide, cyclohexanone peroxide and benzoyl peroxide.

16. The process as claimed in claim 11, wherein the catalyst (d) is at least one member selected from the group consisting of p-toluenesulfonic acid, dodecylbenzenesulfonic acid, hydrochloric acid and sulfuric acid.

17. The process as claimed in claim 11, wherein said catalyst (d) is present in said reactor in an amount 0.05-10% by weight based on the amount of the entire contents of the reactor.

18. The process as claimed in claim 11, wherein said initiator (c) is present in said reactor in an amount 0.01-20% by weight based on the vinyl-based monomer (a).

19. The process as claimed in claim 11, wherein a ratio of said alcohol (b)/said vinyl-based monomer (a) is in a range of 0.1-10.

20. The process as claimed in claim 11 wherein a molecular weight of said alcohol (b) is 200 or lower.

* * * * *